US011823082B2

(12) United States Patent
Koneru et al.

(10) Patent No.: US 11,823,082 B2
(45) Date of Patent: Nov. 21, 2023

(54) METHODS FOR ORCHESTRATING AN AUTOMATED CONVERSATION IN ONE OR MORE NETWORKS AND DEVICES THEREOF

(71) Applicant: Kore.ai, Inc., Orlando, FL (US)

(72) Inventors: Rajkumar Koneru, Windermere, FL (US); Prasanna Kumar Arikala Gunalan, Hyderabad (IN)

(73) Assignee: KORE.AI, INC., Orlando, FL (US)

( * ) Notice: Subject to any disclaimer, the term of this patent is extended or adjusted under 35 U.S.C. 154(b) by 456 days.

(21) Appl. No.: 16/868,250

(22) Filed: May 6, 2020

(65) Prior Publication Data
US 2021/0350263 A1    Nov. 11, 2021

(51) Int. Cl.
| | |
|---|---|
| *G06N 20/00* | (2019.01) |
| *H04L 51/02* | (2022.01) |
| *G06N 5/043* | (2023.01) |
| *G06F 40/30* | (2020.01) |

(52) U.S. Cl.
CPC ............. *G06N 5/043* (2013.01); *G06F 40/30* (2020.01); *G06N 20/00* (2019.01); *H04L 51/02* (2013.01)

(58) Field of Classification Search
CPC .......... G06N 5/043; G06N 20/00; G06N 3/08; G06N 5/02; G06N 7/005; G06F 40/30; H04L 51/02; H04L 51/52
See application file for complete search history.

(56) References Cited

U.S. PATENT DOCUMENTS

| | | | |
|---|---|---|---|
| 6,766,320 B1 | 7/2004 | Wang et al. | |
| 6,804,670 B2 | 10/2004 | Kreulen et al. | |
| 7,149,983 B1 | 12/2006 | Robertson et al. | |
| 7,197,460 B1 | 3/2007 | Gupta et al. | |

(Continued)

FOREIGN PATENT DOCUMENTS

| | | |
|---|---|---|
| JP | 2012248161 A | 12/2012 |
| WO | 2013155619 A1 | 10/2013 |

OTHER PUBLICATIONS

Chris Ackerson, Developing with IBM Watson Retrieve and Rank: Part 3 Custom Features, Apr. 7, 2016 [retrieved on Jun. 11, 2020], Medium.com, Retrieved from the Internet:< URL: https://medium.com/machine-learning-with-IBM-watson/developing-with-ibm-watson-retrieve-and-rank-part-3-custom-features-826fe88a5c63>.

(Continued)

*Primary Examiner* — Soe Hlaing
(74) *Attorney, Agent, or Firm* — Troutman Pepper Hamilton Sanders LLP (Rochester)

(57) ABSTRACT

A virtual assistant server receives an utterance from an input mechanism. Upon receiving the utterance, the virtual assistant server, evaluates the utterance to identify a plurality of intents corresponding to the utterance and calculates common scores using natural language processing techniques for each of the identified plurality of intents. The virtual assistant server ranks the identified plurality of intents based on the calculated common scores and based on the ranking identifies a first winning intent and a second winning intent. Subsequently, the virtual assistant server prioritizes one of the first winning intent or the second winning intent to identify a final winning intent based on context information. The virtual assistant server executes the final winning intent and forwards a response to the input mechanism.

12 Claims, 11 Drawing Sheets

(56) References Cited

U.S. PATENT DOCUMENTS

| | | | |
|---|---|---|---|
| 7,225,184 | B2 | 5/2007 | Carrasco et al. |
| 7,702,508 | B2 | 4/2010 | Bennett |
| 7,725,307 | B2 | 5/2010 | Bennett |
| 7,912,702 | B2 | 3/2011 | Bennett |
| 8,942,986 | B2 | 1/2015 | Cheyer et al. |
| 9,070,366 | B1 | 6/2015 | Mathias et al. |
| 9,576,574 | B2 | 2/2017 | van Os |
| 9,836,177 | B2 | 12/2017 | Brown et al. |
| 10,044,857 | B2 | 8/2018 | Philbin |
| 10,282,419 | B2 | 5/2019 | Hebert et al. |
| 10,437,841 | B2 | 10/2019 | Robichaud |
| 11,308,169 | B1* | 4/2022 | Koukoumidis ........ G06N 7/005 |
| 2007/0055529 | A1 | 3/2007 | Kanevsky et al. |
| 2011/0238408 | A1 | 9/2011 | Larcheveque et al. |
| 2012/0041903 | A1 | 2/2012 | Beilby et al. |
| 2012/0265528 | A1 | 10/2012 | Gruber et al. |
| 2013/0159306 | A1 | 6/2013 | Janssen, Jr. et al. |
| 2014/0122083 | A1 | 5/2014 | Xiaojiang |
| 2015/0286747 | A1 | 10/2015 | Anastasakos et al. |
| 2016/0275058 | A1 | 9/2016 | Starostin et al. |
| 2018/0232563 | A1 | 8/2018 | Albadawi et al. |
| 2018/0358006 | A1 | 12/2018 | McConnell et al. |
| 2019/0108486 | A1 | 4/2019 | Jain et al. |
| 2019/0179902 | A1 | 6/2019 | Srivastava et al. |
| 2019/0180288 | A1* | 6/2019 | Shaev ................. H04M 3/5166 |
| 2019/0199658 | A1 | 6/2019 | Kim et al. |
| 2019/0303438 | A1 | 10/2019 | Wilson et al. |
| 2020/0342850 | A1* | 10/2020 | Vishnoi ................. H04L 51/214 |

OTHER PUBLICATIONS

An ensemble of retrieval-based and generation-based human-computer conversation systems. International Conference on Learning Representations, 2018, [retrieved on Jun. 11, 2020], https://openreview.net/, Retrieved from the Internet:< URL: https://openreview.net/pdf?id=Sk03Yi10Z>.

Ioannis Papaioannou, Amanda Cercas Curry, Jose L. Part Igor Shalyminov, Xinnuo Xu, Yanchao Yu Ondrej Dušek, Verena Rieser, Oliver Lemon, Alana: social dialogue using an ensemble model and a ranker trained on user feedback, 2017 [retrieved on Jun. 11, 2020], 1st Proceedings of Alexa Prize (Alexa Prize 2017), https://s3.amazonaws.com/, Retrieved from the Internet:< URL: https://s3.amazonaws.com/alexaprize/2017/technical-article/alana.pdf>.

Iacobelli, G., 2017. Anatomy of customer support automation with IBM Watson. [online] https://tutorials.botsfloor.com/. Available at: <https://tutorials.botsfloor.com/anatomy-of-customer-support-automation-with-ibm-watson-2a347081df46> [Accessed Mar. 31, 2021].

Xu, P. and Sarikaya, R., 2013. Exploiting Shared Information for Multi-intent Natural Language Sentence Classification. Interspeech, [online] Available at: <https://www.isca-speech.org/archive/archive_papers/interspeech_2013/i13_3785.pdf> [Accessed Mar. 31, 2021].

Jun. 2014, The Multimodal Virtual Assistant, Johnston, Michael and Chen, John and Ehlen, Patrick and Jung, Hyuckchul and Lieske, Jay and Reddy, Aarthi and Selfridge, Ethan and Stoyanchev, Svetlana and Vasilieff, Brant and Wilpon, Jay, "Proceedings of the 15th Annual Meeting of the Special Interest Group on Discourse and Dialogue", Association for Computational Linguistics,<https://www.aclweb.org/anthology/W14-4335> [Accessed Mar. 31, 2021].

Jun. 2013, Identifying Intention Posts in Discussion Forums,Chen, Zhiyuan and Liu, Bing and Hsu, Meichun and Castellanos, Malu and Ghosh, Riddhiman, Proceedings of the 2013 Conference of the North {A}merican Chapter of the Association for Computational Linguistics: Human Language Technologies, Association for Computational Linguistics, <https://www.aclweb.org/anthology/N13-1124>[Accessed Mar. 31, 2021].

Surmenok, P., 2016. Natural Language Pipeline for Chatbots. [online] Medium. Available at: <https://medium.com/@surmenok/natural-language-pipeline-for-chatbots-897bda41482> [Accessed Mar. 31, 2021].

GitHub. 2013. Multiple intents in a single sentence • Issue #18 • wit-ai/wit. [online] Available at: <https://github.com/wit-ai/wit/issues/18> [Accessed Mar. 31, 2021].

https://www.wit-software.com/. 2017. Powering Virtual assistants with artificial intelligence. [online] Available at: <https://www.wit-software.com/wp-content/uploads/2017/03/leaflet_wit-bots-platform.pdf> [Accessed Mar. 31, 2021].

Prnewswire.com. 2017. Facebook partners with Kore.ai for bot development, opens Workplace for bot integration at F8. [online] Available at: <https://www.prnewswire.com/news-releases/facebook-partners-with-koreai-for-bot-development-opens-workplace-for-bot-integration-at-f8-300441673.html> [Accessed Mar. 31, 2021].

NERAJPUT1607 et al., Docs.microsoft.com. 2019. Adding chit-chat to a QnA Maker knowledge base—Azure Cognitive Services. [online] Available at: <https://docs.microsoft.com/en-us/azure/cognitive-services/QnAMaker/how-to/chit-chat-knowledge-base?tabs=v1> [Accessed Sep. 9, 2021].

Kozhaya, J., 2017. Train and evaluate custom machine learning models. [online] IBM Developer. Available at: <https://developer.ibm.com/blogs/train-and-evaluate-custom-machine-learning-models/> [Accessed Apr. 1, 2021].

Guo, S. et al., 2017. Conversational Bootstrapping and Other Tricks of a Concierge Robot. [online] https://www.researchgate.net/publication/314164238_Conversational_Bootstrapping_and_Other_Tricks_of_a_Concierge_Robot. Available at: <https://www.researchgate.net/publication/314164238_Conversational_Bootstrapping_and_Other_Tricks_of_a_Concierge_Robot> [Accessed Apr. 1.

Hlib Babii et al. https://arxiv.org/. 2019. Modeling Vocabulary for Big Code Machine Learning. [online] Available at: <https://arxiv.org/pdf/1904.01873.pdf> [Accessed Apr. 1, 2021].

Joshi, M. et al., 2012. Multi-Domain Learning: When Do Domains Matter? [online] https://www.aclweb.org. Available at: <https://www.aclweb.org/anthology/D12-1119.pdf> [Accessed Apr. 1, 2021].

Medium. 2017. Hello, thanks and bye!. [online] Available at: <https://medium.com/wit-ai/hello-thanks-and-bye-2dd077792fc3> [Accessed Sep. 7, 2021].

Kore.ai Documentation v7.2. Feb. 8, 2020. Knowledge Graph—Kore.ai Documentation v7.2. [online] Available at: <https://developer.kore.ai/v7-2/docs/bots/bot-builder-tool/knowledge-task/creating-a-knowledge-graph/> [Accessed Sep. 8, 2021].

Kore.ai Documentation v7.2. Feb. 8, 2020. Improving Bot Performance—NLP Optimization—Kore.ai Documentation v7.2. [online] Available at: <https://developer.kore.ai/v7-2/docs/bots/nlp/optimizing-bots/> [Accessed Sep. 8, 2021].

Kore.ai Documentation v7.2. Feb. 8, 2020. Natural Language Processing (NLP)—Kore.ai Documentation v7.2. [online] Available at: <https://developer.kore.ai/v7-2/docs/bots/chatbot-overview/nlp-guide/#Intent_Detection> [Accessed Sep. 8, 2021].

Kore.ai. May 9, 2017. Why combine Fundamental Meaning and Machine Learning for NLP? | kore.ai. [online] Available at: <https://kore.ai/ufaqs/combine-fundamental-meaning-machine-learning-nlp/> [Accessed Sep. 8, 2021].

Microsoft.github.io. Feb. 3, 2020. Manifest. [online] Available at: <https://microsoft.github.io/botframework-solutions/skills/handbook/manifest/> [Accessed Nov. 26, 2021].

Microsoft.github.io. Feb. 3, 2020. Architecture. [online] Available at: <https://microsoft.github.io/botframework-solutions/skills/handbook/architecture/> [Accessed Nov. 26, 2021].

\* cited by examiner

METHODS FOR ORCHESTRATING AN AUTOMATED CONVERSATION IN ONE OR MORE NETWORKS AND DEVICES THEREOF

FIELD

This technology generally relates to methods and devices for orchestrating an automated conversation in one or more networks.

BACKGROUND

Enterprises are always on the look-out to engage with their users. The quantity and the quality of engagement needs to be optimized to suit the markets they serve. To optimize their engagement with the users, enterprises have been increasingly using digital communication, especially social media platforms. With the improvements made in the field of artificial intelligence, automated mechanisms, such as chatbots, have been developed to assist with digital communication. The ubiquitous nature of these chatbots along with their ability to serve customers 24×7 in multiple channels including social media has made them an attractive user engagement option for enterprises.

The traditional enterprise approach to bot building has focused on each department in the enterprise developing their own specialized chatbots. With the increasing demand for conversational experiences, more and more chatbots will need to be made available to the users. For users, this means that they must interact with multiple chatbots, remember the specific capabilities of each chatbots, and adjust to the different conversation styles of each chatbot. The users may find it complex to search and identify an appropriate chatbot which answers their questions. Such an approach makes the lives of the users difficult and reduces user satisfaction. For the enterprises, this approach causes a waste of time and resources, as it involves multiple development and deployment cycles, low standardization of user experience, re-inventing the wheel, and engaging with multiple vendors to develop chatbots.

To address these issues a universal bot has been used to control the flow of conversation to multiple child bots and eliminate the need for users to talk to multiple bots to get things done, thereby improving the conversational experience and increasing user satisfaction. However, correctly routing the conversation to the appropriate child bot with a universal bot is a problem. One of the reasons for this routing problem is the way the child bots are trained. In one example, the training data set provided to two child bots may have the same or similar training utterances, synonyms, patterns or phrases. If the two child bots have the same or similar training utterances, synonyms, patterns or phrases, then both child bots may respond to the same utterance. This may cause an ambiguity at the universal bot when making a routing decision, as the two child bots have both sent a response to the same utterance because of the similarity in their training. In another example, one child bot may have a small training data set and another child bot may have a large training data set. The output from the child bot with a small training data set may be less reliable than the child bot with a large training data set. Although it may not be apparent while configuring the child bots, such errors in training may cause ambiguity in the executed routing decision of which child bot to select made by the universal bot or may cause the universal bot to route the conversation to an inappropriate child bot. Accordingly, there exists a need for better orchestration of conversation in the universal bot.

SUMMARY

An example of a method for orchestrating an automated conversation includes receiving, by a virtual assistant server, an utterance from an input mechanism. The utterance is evaluated to identify a plurality of intents corresponding to the utterance and calculate common scores using natural language processing techniques for each of the intents. The identified intents based on the calculated common scores are ranked. Based on the ranking, a first winning intent and a second winning intent from the identified intents are identified. Subsequently, one of the first winning intent or the second winning intent is prioritized to identify a final winning intent based on context information. The final winning intent is executed.

In an example, the present disclosure relates to a device that orchestrates an automated conversation comprising, a processor and a memory. The memory coupled to the processor which is configured to be capable of executing programmed instructions stored in the memory to receive an utterance from an input mechanism. The utterance is evaluated to identify a plurality of intents corresponding to the utterance and calculate common scores using natural language processing techniques for each of the intents. The identified intents are ranked based on the calculated common scores. A first winning intent and a second winning intent from the identified intents are identified based on the ranking. One of the first winning intent or the second winning intent is prioritized to identify a final winning intent based on context information and the final winning intent is then executed.

In an example, the present disclosure relates to a non-transitory computer readable storage medium having stored thereon instructions for orchestrating an automated conversation which when executed by a processor, causes the processor to perform steps comprising receiving an utterance from an input mechanism. The utterance is evaluated to identify a plurality of intents corresponding to the utterance and calculate common scores using natural language processing techniques for each of the intents. The identified intents based on the calculated common scores, identifying based on the ranking, a first winning intent and a second winning intent from the identified intents. One of the first winning intent or the second winning intent is prioritized to identify a final winning intent based on context information, and the final winning intent is executed.

In an example, the present disclosure relates to a method of orchestrating an automated conversation by a virtual assistant server. The method includes receiving an utterance from an input mechanism. From a group of built-in child bots and a group of external child bots a subset of built-in child bots and a subset of external child bots capable of responding to the received utterance are identified. The utterance is forwarded to the identified subset of built-in child bots and the subset of external child bots. A score and an intent name are received from the subset of built-in child bots or the subset of external child bots. Subsequently, any score from the subset of external child bots is rescored to a common scale with any score from the subset of built-in child bots to generate common scores. One or more of the common scores are prioritized based on context information. Based on the prioritization, one of the intent names associated with the common scores is identified as a winning intent. A response from one of the built-in child bots of the subset of built-in child bots or one of the external child bot of the subset of external child bots corresponding to the identified winning intent is forwarded to the input mechanism.

DETAILED DESCRIPTION

Figure 1:
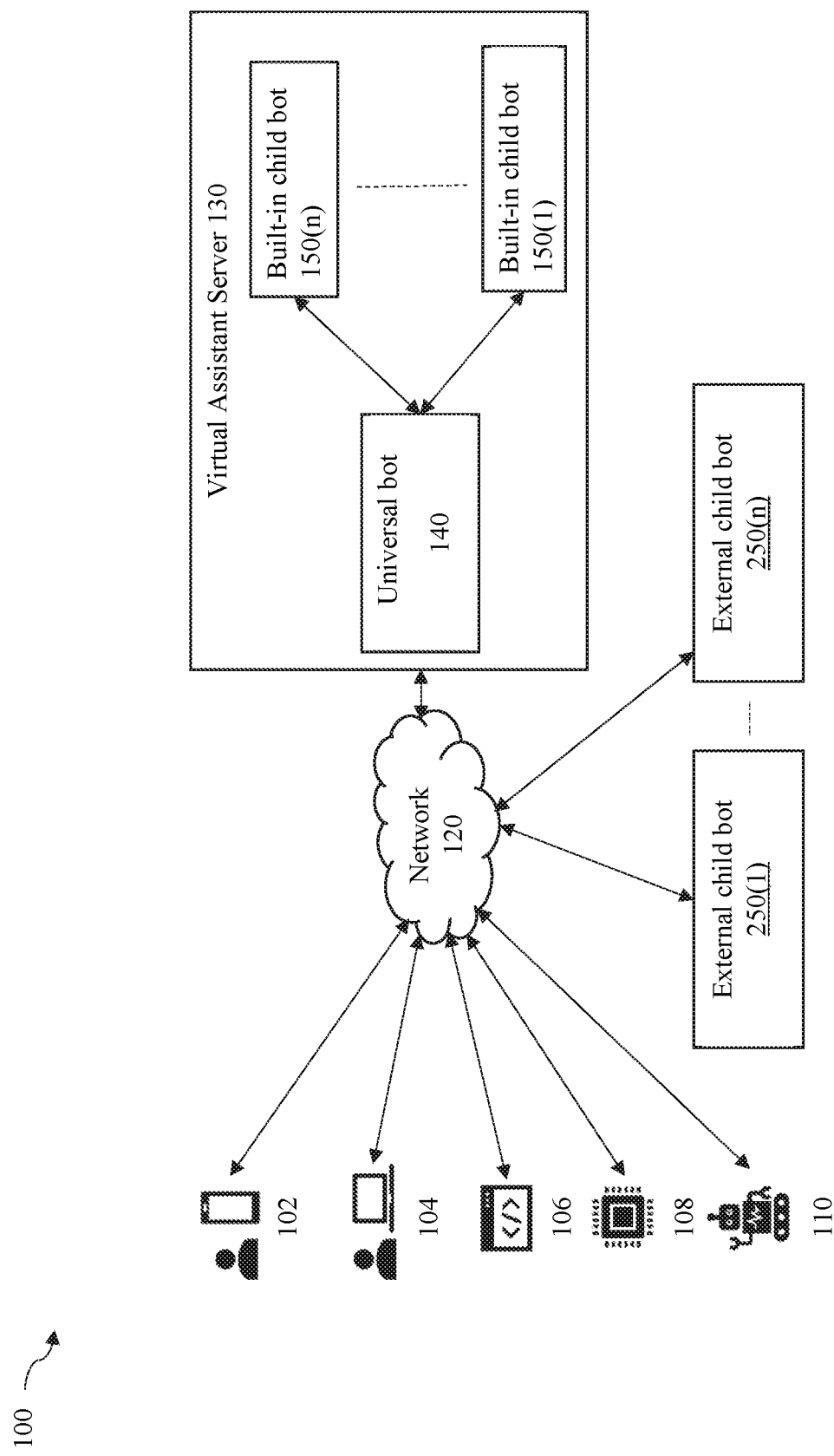
FIG. 1 is a block diagram of an exemplary environment with an example of a system to orchestrate an automated conversation.

An example of an automated conversation orchestration environment 100 is illustrated in FIG. 1. The exemplary environment 100 includes an input mechanism including a mobile computing device 102, a personal computing device 104, a software program 106, a hardware device 108, or an intelligent device 110 and a virtual assistant server (VA server) 130 which are coupled together by a network 120, although the environment 100 can include other types and numbers of devices, components, elements and communication networks in other topologies and deployments. Additionally, the mobile computing device 102, the personal computing device 104, the software program 106, the hardware device 108, or the intelligent device 110 and the virtual assistant server 130 can communicate using wired technologies such as Local Area Network (LAN), a Wide Area Network (WAN) or wireless technologies such as Wi-Fi, 3G, 4G or 5G. While not shown, the exemplary environment 100 may include additional components, such as routers, switches and other devices which are well known to those of ordinary skill in the art and thus will not be described here. Examples of this technology provide a number of advantages including providing more effective and efficient methods, non-transitory computer readable medium and devices for orchestrating an automated conversation with the VA server 130 managing one or more built-in and/or external child bots.

Referring more specifically to FIG. 1, the VA server 130 interacts with one or more of the mobile computing device 102, the personal computing device 104, the software program 106, the hardware device 108, or the intelligent device 110 through the network 120. The network 120 may use wired technologies such as a Local Area Network (LAN), a Wide Area Network (WAN) or wireless technologies such as Wi-Fi, 3G, 4G or 5G, although the network 120 can include other network topologies. Additionally, the VA server 130 may be hosted on a cloud or provided as a service. The VA server 130 may include a back-end server, a computer, or a plurality of computer executing a software application that enables communication with the components illustrated in the environment 100.

The VA server 130 hosts a universal bot 140 and a plurality of built-in child bots 150(1)-150(n), although the VA server 130 may host and/or interact with other types of systems, devices, components or other elements. In this example, the VA server 130 may also interact with a plurality of external child bots 250(1)-250(n) using the network 120 and which may be hosted by third-party servers. The universal bot 140 executes the tasks, intents or dialog flows of the plurality of built-in child bots 150(1)-150(n) or the plurality of external child bots 250(1)-250(n) by routing utterances to the corresponding child bot. The universal bot 140 interprets an utterance and maps the interpreted utterance to the appropriate one of a plurality of internal and/or external child bots. The universal bot 140 and the plurality of built-in child bots 150(1)-150(n) may be physically coupled to each other or communicatively coupled to each other using wired technologies such as Local Area Network (LAN), a Wide Area Network (WAN) or wireless technologies such as Wi-Fi, 3G, 4G or 5G. Alternatively, the universal bot 140 and the plurality of built-in child bots 150(1)-150(n) may also be part of one or more software programs hosted in one or more servers which may be part of or external to the VA server 130.

As illustrated in FIG. 1, the VA server 130 may communicate with the plurality of built-in child bots 150(1)-150(n) or the plurality of external child bots 250(1)-250(n). Alternatively, in another example, the VA server 130 may communicate with only the plurality of built-in child bots 150(1)-150(n). In another example, the VA server 130 may communicate with only the plurality of external child bots 250(1)-250(n). In another applications, the illustrated examples may have other types or numbers of other systems, devices, components, or other elements in other arrangements. The plurality of built-in child bots 150(1)-150(n) may differ in structure and operation with each other including in how each is trained. For example, the built-in child bot 150(1) may have a component relationship driven engine 222 as shown in FIG. 2 and the built-in child bot 150(2) may not have it, although the plurality of built-in child bots 150(1)-150(n) may have other types and/or numbers of differences.

The input mechanisms 102-110 comprising the mobile computing device 102, the personal computing device 104, the software program 106, the hardware device 108, or the intelligent device 110 may send the utterance to the VA server 130. The mobile computing device 102, may be, for example, a mobile telephone, a smartphone, a wearable device, a tablet, a laptop or the like. The personal computing device 104 may be a personal computer or the like. The hardware device 108, may be, for example, a processor, an internet of things (IoT) device, a configurable hardware logic such as a field programmable gate array ("FPGAs", field programmable logic devices ("FPLDs"), application specific integrated circuits ("ASICs") or programmable logic units ("PLUs") or the like. The software program 106, may be, for example, a rule-based program or a program based on machine learning, neural networks, artificial intelligence or the like. The intelligent device 110, may be, for example, a virtual assistant server, a device executing a chatbot, or the like. In one example, the mobile computing device 102, the personal computing device 104, the hardware device 108 or the intelligent device 110 may host and execute the software program 106.

The network 120 may enable communication between the mobile computing device 102, the personal computing device 104, the software program 106, the hardware device 108, or the intelligent device 110 and the virtual assistant server 130 using wired technologies such as Local Area Network (LAN), a Wide Area Network (WAN) or wireless technologies such as Wi-Fi, 3G, 4G or 5G. The network traffic between VA server 130 and the network 120 may be monitored and regulated by a firewall.

Figure 2:
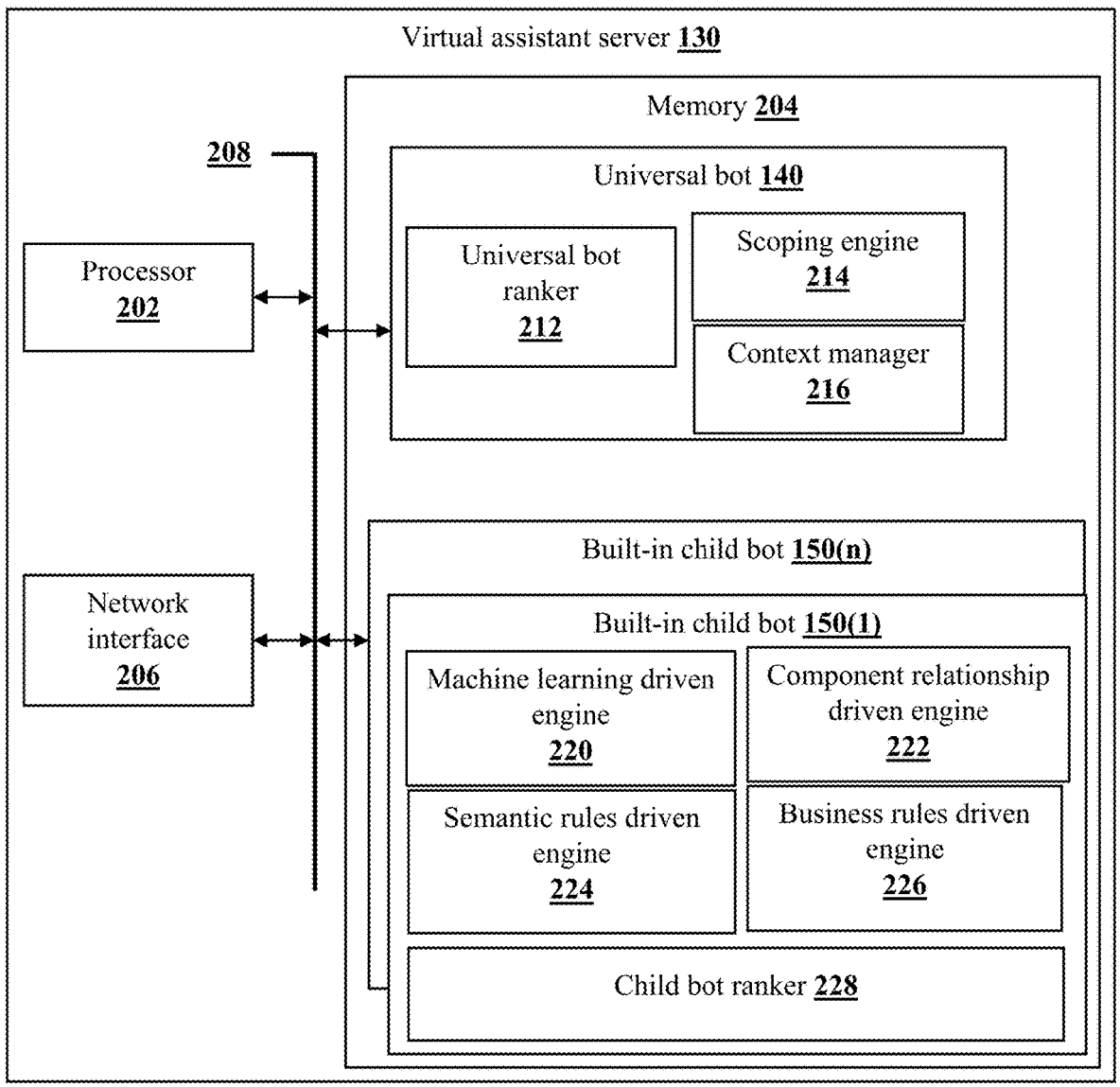
FIG. 2 is a block diagram of an example of components and memory within a virtual assistant server shown in FIG. 1.

An example of the VA server 130 is illustrated in FIG. 2. In this example, the VA server 130 may include a processor 202, a memory 204, a network interface 206, and an interconnect bus 208, although the VA server 130 may comprise other types or numbers of other systems, devices, components, or other elements in other configurations. The memory 204 may include a universal bot 140 and a plurality of built-in child bots 150(1)-150(n).

The processor 202 may execute one or more computer executable instructions stored in the memory 204 for the methods illustrated and described with reference to the examples herein, although the processor can execute other types and numbers of instructions and perform other types and numbers of operations. The processor 202 may comprise one or more central processing units ("CPUs") or general purpose processors with one or more processing cores, such as AMD® processor(s), although other types of processor(s) could be used (e.g., Intel®).

The network interface 206 may provide or enable communication between the VA server 130 and other devices or systems, such as the mobile computing device 102, the personal computing device 104, the software program 106, the hardware device 108, or the intelligent device 110 by way of example, via a network 120. By way of example only, the network interface 206 may use TCP/IP over Ethernet and industry-standard protocols, including NFS, CIFS, SOAP, XML, LDAP and SNMP although other types and numbers of communication protocols can be used. The network interface 206 may also provide or enable communication with the VA server 130 across one or more networks such as a wired or a wireless network including the internet.

The memory 204 is an example of a non-transitory computer readable storage medium capable of storing information or instructions. The memory 204 may be a random-access memory, a read only memory (ROM), an erasable programmable read-only memory (EPROM), an electrically erasable programmable read-only memory (EEPROM), a portable optical disk including a CD, a DVD, a hard drive, a magnetic disk, a USB memory card, a memory stick or other electronic, magnetic, optical, electromagnetic, infrared or semiconductor based non-transitory computer-readable storage medium which may be used to tangibly store instructions, which when executed, perform one or more of the disclosed examples. The term computer-readable storage medium does not include signals and carrier waves. Examples of the programmed instructions and steps stored in the memory 204 are illustrated and described by way of the description and examples herein. In this example, the memory 204 may include the universal bot 140 and the plurality of built-in child bots 150(1)-150(n).

The universal bot 140 includes a universal bot ranker 212, a scoping engine 214, and a context manager 216, although the universal bot 140 may include other types of components in other examples. The universal bot 140 may receive the utterance or other input and the scoping engine 214 may identify a subset of the plurality of built-in child bots 150(1)-150(n) or a subset of the plurality of external child bots 250(1)-250(n) capable of responding to the received utterance. The universal bot 140 may forward the utterance to the subset of plurality of built-in child bots 150(1)-150(n) or the subset of the plurality of external child bots 250(1)-250(n). The plurality of built-in child bots 150(1)-150(n) or the plurality of external child bots 250(1)-250(n) may be linked to the universal bot 140. During the linking, an invocation phrase or training utterances may be added to each of the plurality of built-in child bots 150(1)-150(n) or each of the plurality of external child bots 250(1)-250(n). The context manager 216 maintains and outputs context information such as presence of an invocation name in the utterance, eligible child bots, a current child bot, current dialog context and recently used child bots, although the context information may include other types of information in other examples. The plurality of built-in child bots 150(1)-150(n) or the plurality of external child bots 250(1)-250(n) may be programmed or configured with one or more intents. Each of the one or more intents may have a dialog, which includes a flow followed by the automated conversation when the utterance matches the one or more intents. Any one of the input mechanisms 102-110 or an administrator operating any one of the input mechanisms 102-110 may configure the flow by programming or by using drag-and-drop nodes in a graphical user interface. The current dialog context may include information about a specific node being executed in the dialog. The current dialog context may also include information about the previous node, next node of the specific node. The current dialog context may also include values for entity variables, dialog sentiment variables, business rule variables or any administrator defined variables created during the configuration. The universal bot 140 may use the context information to prioritize one or more of the subset of the plurality of built-in child bots 150(1)-150(n) or one or more of the subset of the plurality of external child bots 250(1)-250(n).

The scoping engine 214 may identify the subset of the plurality of built-in child bots 150(1)-150(n) or the subset of the plurality of external child bots 250(1)-250(n) partially or completely based on the context information provided by the context manager 216. The universal bot ranker 212 may receive intent names, confidence scores, common scores, training utterances or the like from the subset of the plurality of built-in child bots 150(1)-150(n) or the subset of the plurality of external child bots 250(1)-250(n). The universal bot ranker 212 may also receive the context information from the context manager 216. Based on the received information, the universal bot ranker 212 may identify a final winning intent, although the universal bot ranker 212 may perform other types and/or numbers of other operations and functions.

Each of the plurality of built-in child bots 150(1)-150(n) includes one of a machine learning driven engine 220(1)-220(n), one of a component relationship driven engine 222(1)-222(n), one of a semantic rules driven engine 224(1)-224(n), one of a business rules driven engine 226(1)-226(n) and one of a child bot ranker 228(1)-228(n), although one or more of the plurality of built-in child bots 150(1)-

150(*n*) may include other types of engines to drive intent recognition. The received utterance may be input to one or more of these engines. The one or more of these engines may process the received utterance and may output one or more engine level winning intents to their corresponding child bot rankers 228(1)-228(*n*). The corresponding child bot rankers 228(1)-228(*n*) may receive the engine level winning intents, rank the engine level winning intents and output a child bot level winning intent to the universal bot which selects a final winning intent or intents.

The plurality of external child bots 250(1)-250(*n*) may be developed by a third-party and hosted in an external network. In this example, the plurality of external child bots 250(1)-250(*n*) may also include engines, rankers similar to one or more of the machine learning driven engine 220(1)-220(*n*), one or more of the component relationship driven engine 222(1)-222(*n*), one or more of the semantic rules driven engine 224(1)-224(*n*), one or more of the business rules driven engine 226(1)-226(*n*) or one or more the child bot ranker 228(1)-228(*n*), although one or more of the plurality of external child bots 250(1)-250(*n*) may differ in structure and operation with each other and/or from the plurality of built-in child bots 150(1)-150(*n*).

Figure 3:
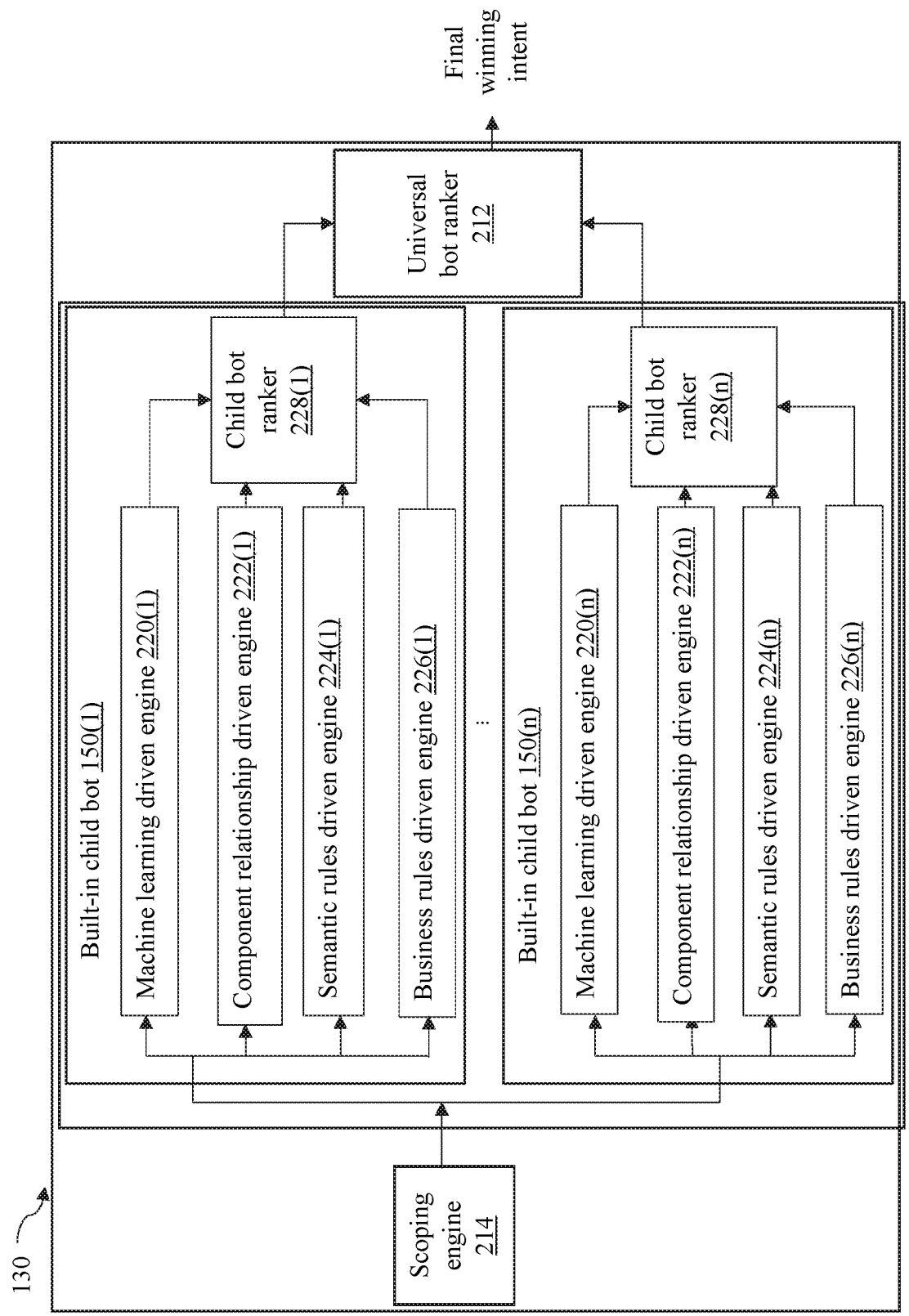
FIG. 3 is a partial block and partial functional diagram of the example of a portion of the components within the virtual assistant server shown in FIG. 2.

FIG. 3 is a partial block and partial functional diagram of an example of a portion of the components within the VA server 130 shown in FIG. 1. In this example, the VA server 130 includes the components of the universal bot 140, including the universal bot ranker 212, the scoping engine 214, and the context manager 216 (not shown). Further, the VA server 130 includes the plurality of built-in child bots 150(1)-150(*n*), although the VA server 130 may comprise other types and/or numbers of other systems, engines, components and/or other elements. In this example, each of the plurality of built-in child bots 150(1)-150(*n*) includes one of the machine learning driven engines 220(1)-220(*n*), one of the component relationship driven engines 222(1)-222(*n*), one of the semantic rules driven engines 224(1)-224(*n*), one of the business rules driven engines 226(1)-226(*n*) and one of the child bot rankers 228(1)-228(*n*), although one or more of the plurality of built-in child bots 150(1)-150(*n*) may have other types and/or numbers of systems, engines, components, or other elements.

The scoping engine 214 may receive the utterance and may identify scoped child bots capable of responding to the utterance, although the scoping engine 214 may perform other types and/or numbers of operations or functions. The context manager 216 may send information about the plurality of built-in child bots 150(1)-150(*n*) to the scoping engine 214. Alternatively, the context manager 216 may send to the scoping engine 214 information about eligible child bots comprising a first subset of the plurality of built-in child bots 150(1)-150(*n*) which may be eligible for scoping. The eligible child bots which may be eligible for scoping may be identified by the VA server 130 and stored in the context manager 216 based on an identifier received from the input mechanisms 102-110 illustrated in FIG. 1, although other types of identification mechanisms may be used.

Based on the received information about the plurality of built-in child bots 150(1)-150(*n*), or the eligible child bots, the scoping engine 214 compares the utterance with the invocation phrases of the plurality of built-in child bots 150(1)-150(*n*) or the invocation phrases of the eligible child bots. If the scoping engine 214 detects a match of the utterance with the invocation phrases of one or more of the plurality of built-in child bots 150(1)-150(*n*) or the invocation phrases of one or more of the eligible child bots, then the corresponding one or more of the plurality of built-in child bots 150(1)-150(*n*) or one or more of the eligible child bots are considered scoped child bots. If the scoping engine 214 does not detect a match of the utterance with the invocation phrases of one or more of the plurality of built-in child bots 150(1)-150(*n*) or the invocation phrases of one or more of the eligible child bots, then the scoping engine 214 compares the utterance with the training utterances of the plurality of built-in child bots 150(1)-150(*n*) or the training utterances of the eligible child bots. In case of a match of the utterance with the training utterances of one or more of the plurality of built-in child bots 150(1)-150(*n*) or one or more of the eligible child bots, then the scoping engine 214 considers such one or more of the plurality of built-in child bots 150(1)-150(*n*) or one or more of the eligible child bots as scoped child bots. If the scoping engine 214 does not find a match comparing the utterance with the invocation phrases and the training utterances of one or more of the plurality of built-in child bots 150(1)-150(*n*) or one or more of the eligible child bots, then the universal bot 140 uses one or more of the fallback ones of the plurality of built-in child bots 150(1)-150(*n*) for scoping. The fallback ones of the plurality of built-in child bots 150(1)-150(*n*) may include recently used ones of the plurality of built-in child bots 150(1)-150(*n*) or one or more preferred ones of the plurality of built-in child bots 150(1)-150(*n*), although other ones of the plurality of built-in child bots 150(1)-150(*n*) may be considered the fallback ones of the plurality of built-in child bots 150(1)-150(*n*) or otherwise may be set as defaults based on other factors or categories. In this example, the scoping engine 214 may scope two or more of the plurality of built-in child bots 150(1)-150(*n*) and may forward them the utterance. The two or more of the plurality of built-in child bots 150(1)-150(*n*) may be considered scoped child bots.

The Machine Learning Driven Engine

The machine learning driven engines 220(1)-220(*n*) may receive the utterance from the plurality of built-in child bots 150(1)-150(*n*), although the machine learning driven engines 220(1)-220(*n*) may perform other types and/or numbers of operations or functions. The machine learning driven engines 220(1)-220(*n*) may predict an intent and extract entities from the received utterance. Further, each of the machine learning driven engines 220(1)-220(*n*) may include an intent prediction model to process the utterance and predict the intent corresponding to the utterance and may use supervised, unsupervised or semi-supervised learning. The intent prediction model may be trained using statistical modelling and neural networks, although other manners for training may be used. The intent prediction model may be trained using sample utterances for each intent, although other manners for training may be used. In one example, an intent prediction model may be trained to understand, for example, that a first set of training utterances may correspond to a first intent and a second set of training utterances may correspond to a second intent. Upon receiving the utterance, the intent prediction model may identify whether the received utterance corresponds to the first intent or the second intent. The machine learning driven engines 220(1)-220(*n*) may use techniques such as conditional random fields (CRF) for named entity recognition (NER) and extraction. Further, the machine learning driven engines 220(1)-220(*n*) may use text classification features including n-grams, entity marking, lemmatization, stop word exclusion, word embeddings etc. The utterance may be processed using such methods as described in the examples above for the machine learning driven engines 220(1)-220(*n*), featurized and input to the intent prediction model. The intent prediction model may output an intent name, an intent match type and a confidence score corresponding to the utterance to the corresponding child bot rankers 228(1)-228(n). The intent match may be classified by the machine learning driven engines 220(1)-220(n) into the intent match type, such as definitive or possible by way of example, based on the confidence score. The machine learning driven engines 220(1)-220(n) may also output other types of information in other examples.

The Component Relationship Driven Engine

The component relationship driven engines 222(1)-222(n) may receive the utterance from the plurality of built-in child bots 150(1)-150(n), although the component relationship driven engines 222(1)-222(n) may perform other types and/or numbers of operations or functions. The component relationship driven engines 222(1)-222(n) may include a knowledge graph that represents relationships, such as a hierarchical relationship between nodes, although other types and/or numbers of relationships may be used. Based on the hierarchy, the nodes may be defined as parent nodes and child nodes, although other types of hierarchy arrangements may be used. The knowledge graph may include paths traversing the parent nodes to the child nodes. Each node in the knowledge graph may include a node name, synonyms to the node name and question-answer pairs. The utterance may be searched for a match in the knowledge graph by parsing the utterance to identify terms in the utterance, and mapping the terms to node names, synonyms in the knowledge graph. Paths in the knowledge graph corresponding to the utterance may be shortlisted based on the mapping. Vectors may be created for the utterance. Further, vectors may be created for the questions corresponding to the shortlisted paths. The vectors may be created using techniques such as TFIDF (term frequency-inverse document frequency), although other techniques may be used. These vectors may be compared with the vectors created for the utterance and a confidence score may be generated for each question corresponding to the shortlisted paths. A question match, which may also be considered as the intent match, may be classified into an intent match type, such as definitive or possible by way of example, based on the confidence score and may be output to the corresponding child bot rankers 228(1)-228(n). The component relationship driven engines 222(1)-222(n) may output the intent name, the intent match type and the confidence score to the corresponding child bot rankers 228(1)-228(n), although other types of information may be output by the component relationship driven engines 222(1)-222(n).

The Semantic Rules Driven Engine

The semantic rules driven engines 224(1)-224(n) may receive the utterance from the plurality of built-in child bots 150(1)-150(n), although the semantic rules driven engines 224(1)-224(n) may perform other types and/or numbers of operations or functions. The semantic rules driven engines 224(1)-224(n) may use rules to detect an intent corresponding to the received utterance, although other manners for determining intent may be programmed in the semantics driven engines 224(1)-224(n). The semantic rules driven engines 224(1)-224(n) may strip the received utterance to basic keywords and may use the basic keywords or the synonyms of the basic keywords and rules to identify the intent, although other approaches for automated determination of intent may be used. Additionally, intents may be identified using pre-defined patterns, although other techniques for determining intents may be used. The semantic rules driven engines 224(1)-224(n) may process the utterance using rules and patterns to output an intent name, a confidence score and an intent match type, such as definitive match or possible match by way of example, to the corresponding child bot rankers 228(1)-228(n), although other types of information may be output by the semantic rules driven engines 224(1)-224(n).

The Business Rules Driven Engine

The business rules driven engines 226(1)-226(n) may receive the utterance from the plurality of built-in child bots 150(1)-150(n), although the business rules driven engines 226(1)-226(n) may perform other types and/or numbers of operations or functions. The business rules driven engines 226(1)-226(n) may use specific entities, attributes or details that are part of the received utterance to identify the intent of the utterance, although other manners for determining the intent may be used. The business rules driven engines 226(1)-226(n) may include business rules which correspond to the intent, although other types of rules or logic may be defined or programmed in the business rules driven engines 226(1)-226(n). The business rules may be defined using entities, phrases, attributes or other details. The intent may be identified and executed when the received utterance matches the rule corresponding to the intent. For example, the business rule may comprise that an intent X may be executed when the received utterance includes an "entity 1" and a "phrase 1". The business rules driven engines 226(1)-226(n) may use such rules to evaluate the utterances and identify an intent match. The business rules driven engines 226(1)-226(n) may output the intent name, confidence score and an intent match type, such as definitive match or possible match by way of example, to the corresponding child bot rankers 228(1)-228(n), although other types of information may be output by the business rules driven engines 226(1)-226(n).

One or more of the machine learning driven engines 220(1)-220(n), one or more of the component relationship driven engines 222(1)-222(n), one or more of the semantic rules driven engines 224(1)-224(n), one or more of the business rules driven engine 226(1)-226(n) may or may not send an output to the corresponding one or more of the child bot rankers 228(1)-228(n). It may be understood that, in this example, each of the plurality of built-in child bots 150(1)-150(n) may evaluate the utterance in a same or similar way. One or more of the machine learning driven engines 220 (1)-220(n), one or more of the component relationship driven engines 222(1)-222(n), one or more of the semantic rules driven engines 224(1)-224(n), one or more of the business rules driven engine 226(1)-226(n) may output an intent name, a confidence score and an intent match type such as a definitive or possible match to the corresponding child bot rankers 228(1)-228(n).

In this example, engines corresponding to the scoped child bots comprising the two or more of the plurality of built-in child bots 150(1)-150(n) may identify intent matches and may output the identified intent matches to two or more of the child bot rankers 228(1)-228(n) corresponding to the scoped child bots. The two or more of the child bot rankers 228(1)-228(n) corresponding to the scoped child bots may evaluate the received outputs from the corresponding engines. The two or more of the child bot rankers 228(1)-228(n) corresponding to the scoped child bots may use the corresponding scoring phrases of the engines which identified the intent match, to identify two or more child bot level winning intents. The two or more of the child bot rankers 228(1)-228(n) corresponding to the scoped child bots may forward the two or more child bot level winning intents to the universal bot ranker 212. The universal bot ranker 212 may use the context information sent by the context manager 216 to the universal bot 140 to identify a final winning intent from the two or more child bot level winning intents.

Figure 4:
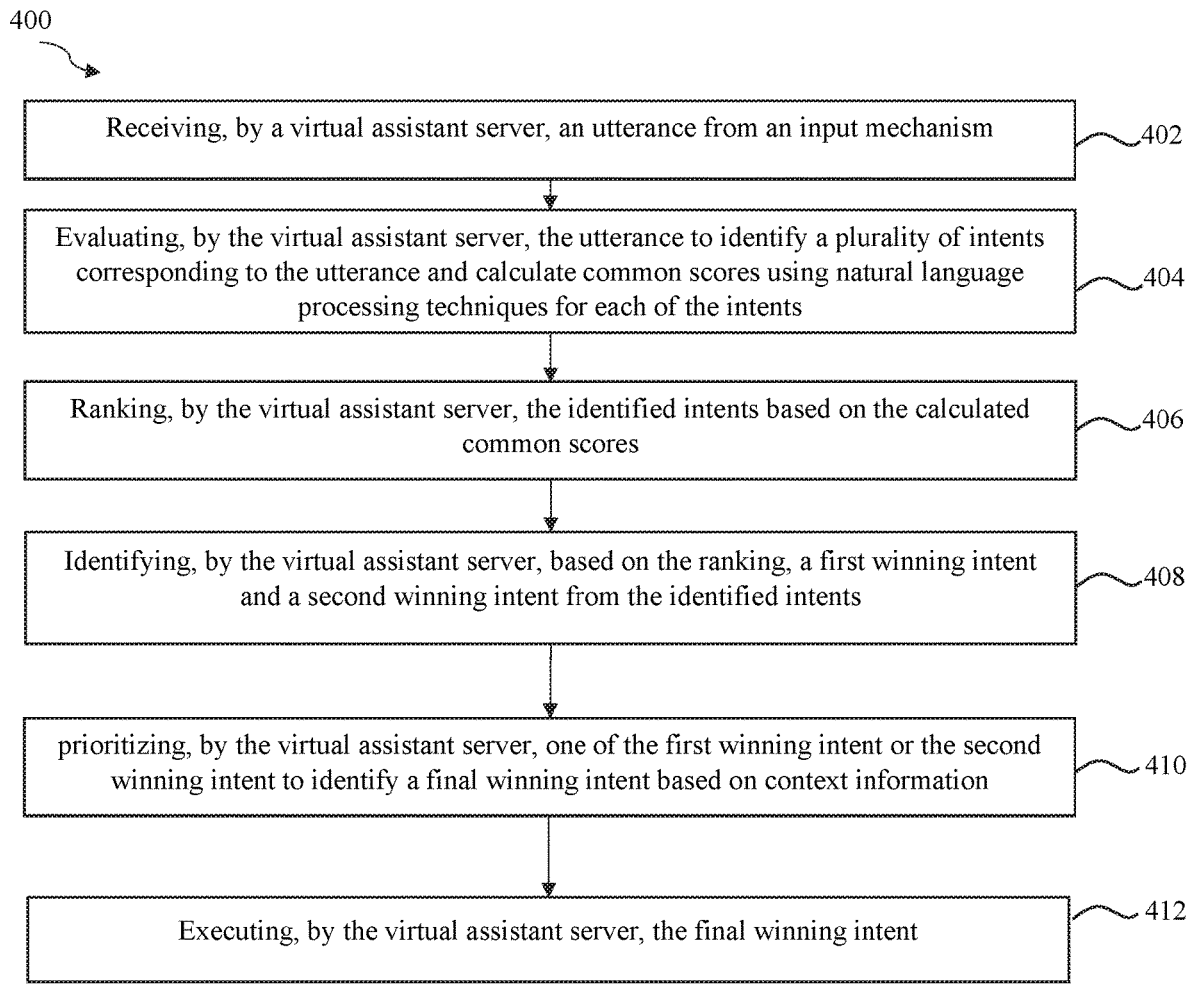
FIG. 4 is a flowchart of an example of a method for receiving and processing an utterance to provide an executable output with the virtual assistant server shown in FIGS. 1-3.

FIG. 4 is a flowchart of an example of a method of the virtual assistant server 130 receiving and processing an utterance to provide an executable output. In some examples, process 400 may be performed by a system similar or identical to system 100 as illustrated in FIG. 1. At step 402, the VA server 130 receives an utterance from any of the input mechanisms 102-110 illustrated in FIG. 1. The utterance may be, for example, "ask JIRA to show the tickets created by me."

At step 404, the VA server 130 evaluates the utterance. The evaluation may include identification of a plurality of intents corresponding to the utterance. By way of example, the plurality of intents identified by the VA server 130 may include "show tickets" identified as a definitive match by the built-in child bot 150(1), "ticket status" identified as a definitive match by the built-in child bot 150(n), and "profile information" identified as a match by the external child bot 250(1). The intents "show tickets" and "ticket status" may be considered the child bot level winning intents of the built-in child bot 150(1) and built-in child bot 150(n) correspondingly. The built-in child bot 150(1), the built-in child bot 150(n) may calculate the confidence scores of the intents "show tickets," "ticket status" correspondingly. The intent "profile information" may be considered the child bot level winning intent of the external child bot 250(1). The built-in child bot 150(1) and the built-in child bot 150(n) of the VA server 130 may use natural language processing techniques, such as machine learning, component relationships, semantic rules and/or business rules configured in the corresponding machine learning driven engines 220(1)-220(n), component relationship driven engines 222(1)-222(n), semantic rules driven engines 224(1)-224(n), business rules driven engines 226(1)-226(n) to identify the plurality of intents, although other techniques, algorithms may be used to identify the plurality of intents. For example, when the built-in child bot 150(1) uses machine learning, the intent prediction model corresponding to the machine learning engine 220(1) may predict an intent corresponding to the utterance. The VA server 130 may receive match information, such as the intent names, intent match types and the confidence scores of the child bot level winning intents of the built-in child bot 150(1) and the built-in child bot 150(n), although the VA server 130 may receive other types of match information, such as other scores, or metadata from the built-in child bot 150(1) and the built-in child bot 150(n). The intent "profile information" may be identified by the external child bot 250(1). The VA server 130 may receive match information such as the intent name: "profile information," intent match type: possible match, confidence score: 0.6 from the external child bot 250(1), although the VA server 130 may receive other types of match information, such as other scores, or metadata from the external child bot 250(1). The match information received by the VA server 130 from the external child bot 250(1) may also include the training utterances of the external child bot 250(1) which caused the intent match with the utterance. The match information received by the VA server 130 from the external child bot 250(1) may further include a response of the external child bot 250(1) for the utterance. In this example, the VA server 130 may also receive the match information such as, for example, the training utterances of the built-in child bot 150(1) or the built-in child bot 150(n) which caused the intent match with the utterance, the response for the utterance from the built-in child bot 150(1) or the built-in child bot 150(n). The external child bot 250(1) may synchronize information, such as training utterances, intent names, synonyms, patterns etc. which are configured in the external child bot 250(1), during the linking phase and periodically thereafter, with the VA server 130. During runtime, the VA server 130 may use this information and identify the match information, for example, the closest training utterances which may have caused the utterance match the intent in the external child bot 250(1), although other types of match information may be identified.

Each engine may output the confidence scores in a different scale. The built-in child bot 150(1) and the built-in child bot 150(n) may normalize the confidence scores output by one or more of the corresponding engines of the built-in child bot 150(1) and the built-in child bot 150(n) when not in the same scale. In other examples, the confidence scores output by one or more of the plurality of built-in child bots 150(1)-150(n) may have a common scale. The VA server 130 may also normalize the confidence scores received from one or more of the plurality of external child bots 250(1)-250(n) and convert them into the common scale used by the plurality of built-in child bots 150(1)-150(n), although one or more of the external child bots 250(1)-250(n) may also use a same scale as the built-in child bots 150(1)-150(n) in other examples. In this example, the VA server 130 may normalize the confidence score of 0.6 received from the external child bot 250(1) into a common score of 0.65 in the common scale output by the built-in child bot 150(1) and the built-in child bot 150(n). The VA server 130 may normalize the confidence score of 0.6 received from the external child bot 250(1), by way of example by comparing the utterance with the received training utterances from the external child bot 250(1) or the identified closest training utterances of the external child bot 250(1) using natural language processing techniques. In this example, the confidence score of the intent "show tickets" may be 0.75, the confidence score of the intent "ticket status" may be 0.8. Additionally, in this example the confidence scores output by the plurality of built-in child bots 150(1)-150(n) may be considered as common scores. In this example, the common score of the intent "show tickets" may be 0.75, the common score of the intent "ticket status" may be 0.8. The common score of the intent "profile information" may be 0.65. In this example, the VA server 130 identifies the plurality of intents "show tickets", "ticket status", "profile information" corresponding to the utterance and calculates the common scores of the identified plurality of intents as 0.75, 0.8 and 0.65 respectively.

At step 406, the VA server 130 ranks the identified intents based on their common scores. In this example, the intents are ranked in the order "show tickets", "ticket status", "profile information" with "show tickets" getting the highest rank by virtue of the examples of the corresponding confidence scores above.

At step 408, the VA server 130 identifies a first winning intent: "show tickets" from the built-in child bot 150(1) and a second winning intent: "ticket status" from the built-in child bot 150(n) based on the ranking, although the VA server 130 may consider more or other intents as winning in other examples.

At step 410, the VA server 130 uses the context information stored in memory 204 to prioritize one of the first winning intent or the second winning intent to identify a final winning intent. The VA server 130, when processing the utterance may use the context information for prioritization once or multiple times. Prioritization enables identification of a most suited intent name corresponding to the utterance. In this example, the context information may include information about: presence of an invocation name in the utterance, eligible child bots, a current child bot, current dialog context and recently used child bots. The prioritization may include adding a bonus score to the common score of the intent when, for example, the built-in or external child bot which output the confidence score corresponding to the common score is a recently used child bot, although other programmed reasons for adding a bonus score and/or other methods of prioritization, such as performing any mathematical operation to the common score, modifying a rank of an intent etc. may be used. Based on the availability of information regarding recently used bots in the context information which may include built-in child bot 150(1), in this example a bonus score of 0.1 is added to the common score of "show tickets" making its common score 0.85, although information regarding: the presence of an invocation name in the utterance, eligible child bots, a current child bot, current dialog context, recently used child bots or other such types of information in the context information may be used by the VA server 130 to add a bonus score to the common score. In this example, after addition of the bonus score, the common score of the intent "show tickets' may be 0.85. As the intent "show tickets" corresponding to the built-in child bot 150(1) has a higher common score than the common scores of the intents "ticket status" and "profile information", the intent "show tickets" is identified as a final winning intent.

At step 412, the VA server 130 executes the final winning intent: "show tickets" corresponding to the built-in child bot 150(1) in this example and forwards the response sent by the built-in child bot 150(1) to one of the input mechanisms 102-110 from which the utterance was received. Alternatively, the VA server 130 may directly forward the response received from the built-in child 150(1) for the intent: "show tickets" to one of the input mechanisms 102-110 from which the utterance was received.

A follow up intent of the final winning intent may be configured in the VA server 130 or added during runtime by the VA server 130. After executing the final winning intent, the VA server 130 may execute the follow up intent. The follow up intent may be for example saved in the memory 204 of the VA server 130 and may include follow up actions to the final winning intent, although the follow up intent may be obtained or otherwise determined in other manners based on the final winning intent. The VA server 130 may look up the memory 204 for the existence of the follow up intent after the executing the final winning intent. If the follow up intent exists, then the VA server 130 executes the follow up intent. In this example, the follow up intent "assign tickets" to the final winning intent "show tickets" may be configured in the VA server 130. The input mechanisms 102-110 or the user operating the input mechanisms 102-110 may be interested in assigning the tickets displayed by the VA server 130 to a human, a software or a system, as the follow up action.

The VA server 130 may also add the follow up intent to the final winning intent during runtime. During the execution of the final winning intent, the VA server 130 may receive a second utterance having a second intent which is different from the final winning intent. In such a case, the VA server 130 may add the second intent as the follow up intent to the final winning intent in the memory 204 and execute the follow up intent after executing the final winning intent.

Figure 5A:
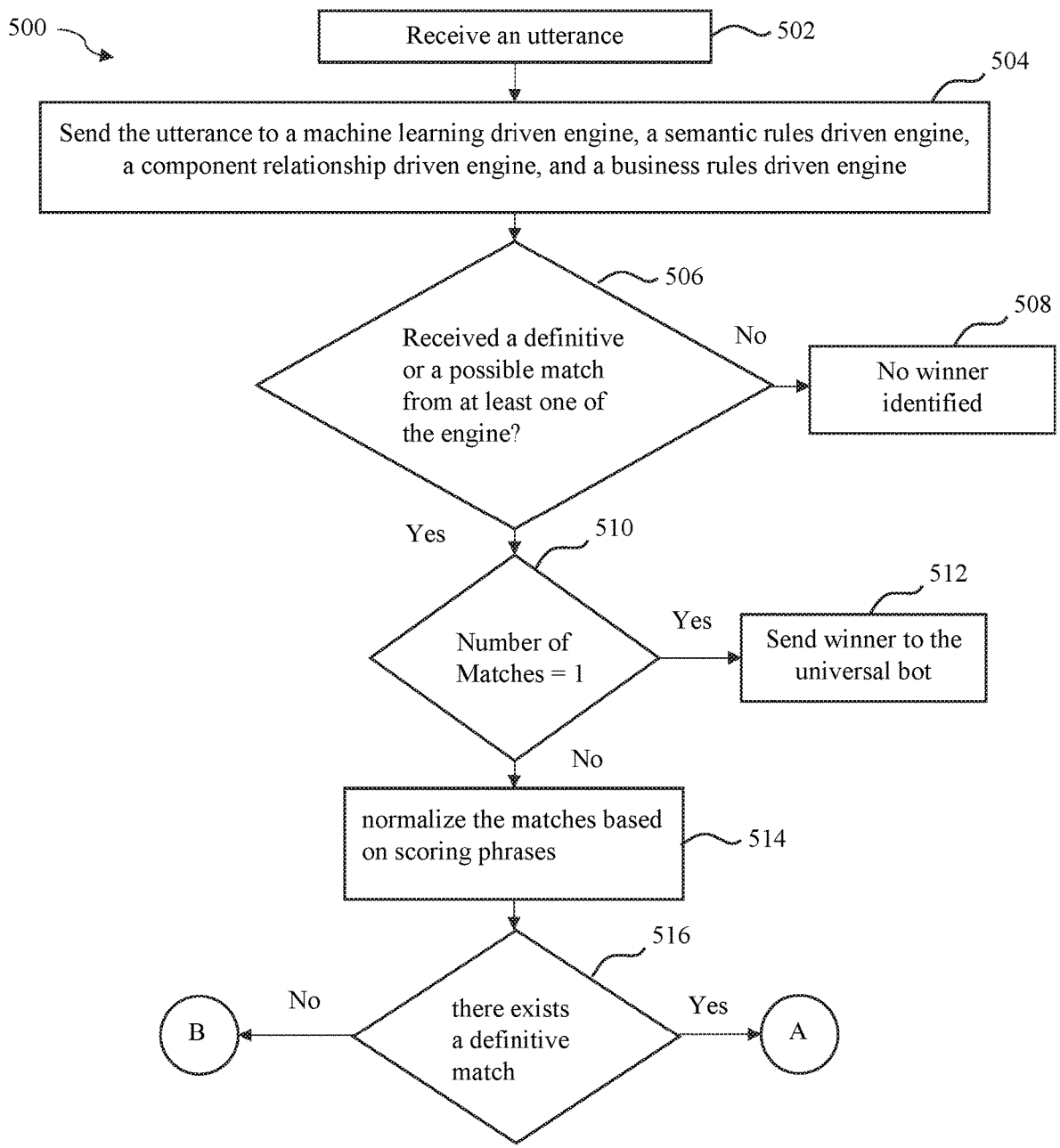
FIG. 5A is a flowchart of an example of a portion of a method for processing an utterance received by the plurality of built-in child bots shown in FIGS. 1-3.

FIG. 5A is a flowchart of a portion of an example of a method 500 for processing an utterance received by one of the plurality of built-in child bots 150(1)-150(n), although the method for processing an utterance by the other ones of the plurality of built-in child bots 150(1)-150(n) would be the same in this example. At step 502, the one of the plurality of built-in child bots 150(1)-150(n) receives an utterance, such as "ask JIRA to show the tickets created by me," from the VA server 130 by way of example.

At step 504, the one of the plurality of built-in child bots 150(1)-150(n) sends the utterance to its corresponding one of the machine learning driven engines 220(1)-220(n), one of the component relationship driven engines 222(1)-222(n), one of the semantic rules driven engines 224(1)-224(n) and/or one of the business rules driven engines 226(1)-226(n), although one or more of the plurality of built-in child bots 150(1)-150(n) may send the utterance to other engines or systems for processing. In this example, each of the corresponding engines 220(1)-220(n), 222(1)-222(n), 224(1)-224(n) and/or 226(1)-226(n) of the one of the plurality of built-in child bots 150(1)-150(n) may evaluate the utterance and in case of a match output an intent name, an intent match type as a definitive or a possible match along with a confidence score. Each of these corresponding engines 220(1)-220(n), 222(1)-222(n), 224(1)-224(n) and/or 226(1)-226(n) of the one of the plurality of built-in child bots 150(1)-150(n) may output the confidence score in a common scale or in a different scale. When the confidence scores output by the corresponding engines 220(1)-220(n), 222(1)-222(n), 224(1)-224(n) and/or 226(1)-226(n) of the one of the plurality of built-in child bots 150(1)-150(n) are in a different scale, the one of the plurality of built-in child bots 150(1)-150(n) normalizes the confidence scores received from one or more of the corresponding engines. The one of the plurality of built-in child bots 150(1)-150(n) may output information, such as a built-in child bot identifier, a built-in child bot name and child bot level winning intent details by way of example. The child bot level winning intent details output by the one of the plurality of built-in child bots 150(1)-150(n) may include, for example, an intent name, an intent identifier, the intent match type such as definitive or possible match, the name of the engine which output the intent, the confidence score and corresponding scoring phrases. In one example, the corresponding scoring phrases may be: training utterances which caused the intent match for the machine learning driven engines 220(1)-220(n), question or alternative question which caused the intent match for the component relationship driven engines 222(1)-222(n), name of the intent which cause the intent match for the semantic relationship driven engines 224(1)-224(n), and the business rule which caused the intent match for the business rules driven engines 226(1)-226(n).

At step 506, the one of the plurality of built-in child bots 150(1)-150(n) may check if the definitive or the possible match is received from at least one of the corresponding machine learning driven engines 220(1)-220(n), component relationship driven engines 222(1)-222(n), semantic rules driven engines 224(1)-224(n), or business rules driven engines 226(1)-226(n). If the definitive or possible match is not received from any of the corresponding engines 220(1)-220(n), 222(1)-222(n), 224(1)-224(n) and/or 226(1)-226(n) of the one of the plurality of built-in child bots 150(1)-150(n), then the method 500 takes the No branch to step 508 where the one of the plurality of built-in child bots 150(1)-150(n) does not output anything to the universal bot 140. Alternatively, at step 508, the one of the plurality of built-in child bots 150(1)-150(n) may output the reasons why the utterance did not match any of the intents of the one of the plurality of built-in child bots 150(1)-150(n) to the universal bot 140.

If at step 506, the definitive or possible match is received from any of the corresponding engines 220(1)-220(n), 222(1)-222(n), 224(1)-224(n) and/or 226(1)-226(n) of the one of the plurality of built-in child bots 150(1)-150(n), then the Yes branch is taken to step 510. At step 510, the one of the plurality of built-in child bots 150(1)-150(n) checks if the total number of definitive or possible matches from the corresponding engines 220(1)-220(n), 222(1)-222(n), 224(1)-224(n) and/or 226(1)-226(n) of the one of the plurality of built-in child bots 150(1)-150(n) is equal to one. If yes, then the method 500 takes the Yes branch to step 512, where the one of the plurality of built-in child bots 150(1)-150(n) considers the one definitive or the one possible match as the child bot level winning intent and sends it to the universal bot 140.

If the total number of definitive or possible matches from all the corresponding engines 220(1)-220(n), 222(1)-222(n), 224(1)-224(n) and/or 226(1)-226(n) of the one of the plurality of built-in child bots 150(1)-150(n) are more than one, then the No branch is taken to step 514. At step 514, the one of the plurality of built-in child bots 150(1)-150(n) normalizes all the definitive or possible matches received from the corresponding engines 220(1)-220(n), 222(1)-222(n), 224(1)-224(n) and/or 226(1)-226(n) of the one of the plurality of built-in child bots 150(1)-150(n) based on the corresponding scoring phrases. Based on the engine which outputs the intent name, the one of the plurality of built-in child bots 150(1)-150(n) normalizes the received confidence scores by, for example, semantically comparing the utterance with the corresponding scoring phrase output by the corresponding engines 220(1)-220(n), 222(1)-222(n), 224(1)-224(n) and/or 226(1)-226(n) of the one of the plurality of built-in child bots 150(1)-150(n). After the one of the plurality of built-in child bots 150(1)-150(n) normalizes all the definitive or possible matches output by the corresponding engines 220(1)-220(n), 222(1)-222(n), 224(1)-224(n) and/or 226(1)-226(n) of the one of the plurality of built-in child bots 150(1)-150(n), then the method 500 proceeds to step 516.

At step 516, the one of the plurality of built-in child bots 150(1)-150(n) checks if there exists a definitive match in the definitive or possible matches output by the corresponding engines 220(1)-220(n), 222(1)-222(n), 224(1)-224(n) and/or 226(1)-226(n) of the one of the plurality of built-in child bots 150(1)-150(n), after normalization of the confidence scores. If yes, the method 500 takes the Yes branch to step 532 of FIG. 5B. If not, the method 500 takes the No branch to step 540 of FIG. 5B.

Figure 5B:
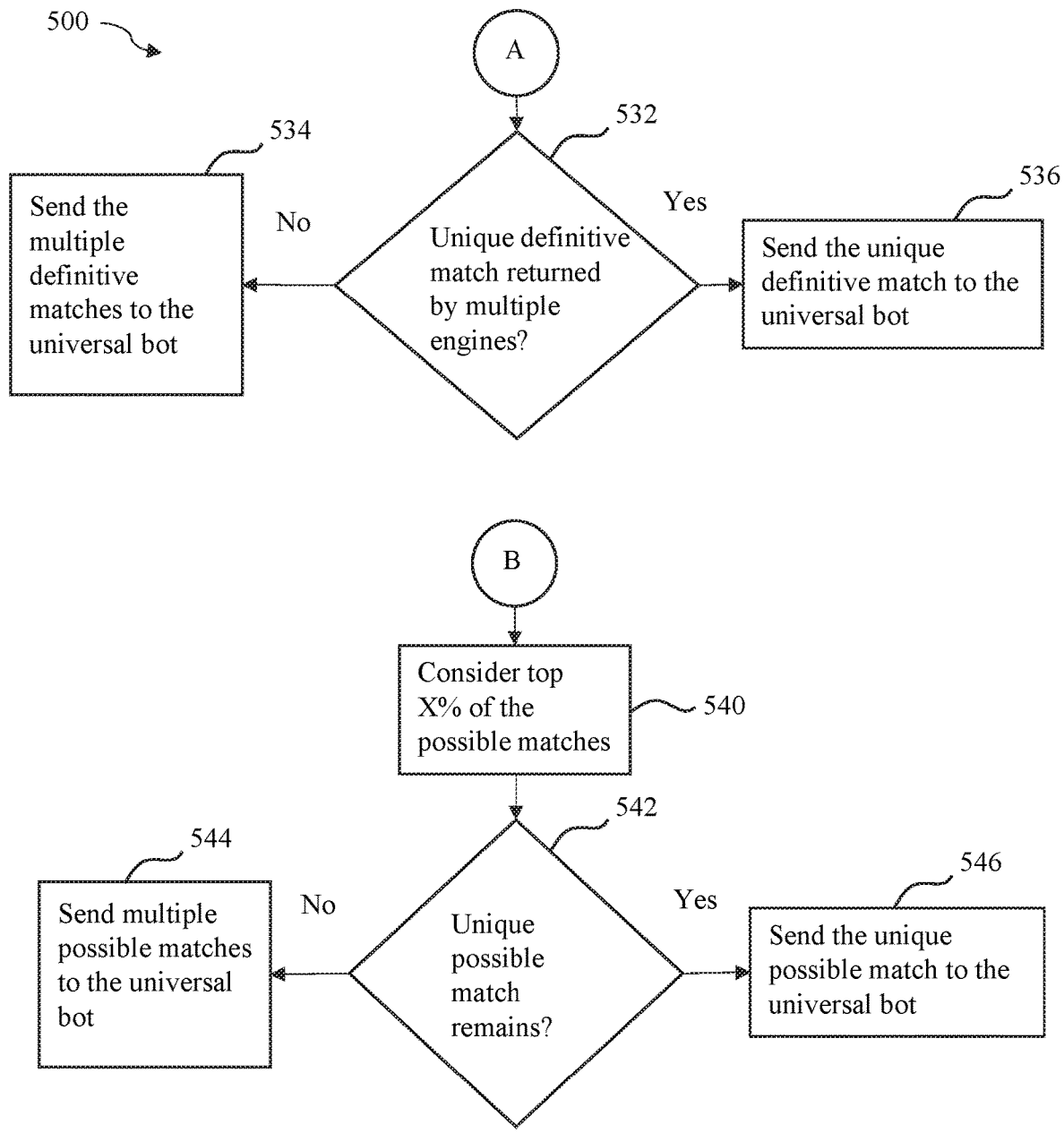
FIG. 5B is a flowchart of another portion of the example of the method for processing the utterance shown in FIG. 5A.

FIG. 5B is a flowchart of another portion of the example of the method 500 for processing an utterance received by the one of the plurality of built-in child bots 150(1)-150(n). At step 532, the one of the plurality of built-in child bots 150(1)-150(n) checks if there exists a unique definitive match among the definitive or possible matches after normalization of the confidence scores. If there exists a unique definitive match, the method 500 takes the Yes branch from step 532 to step 536 and the one of the plurality of built-in child bots 150(1)-150(n) considers the unique definitive match as the child bot level winning intent which is sent to the universal bot 140. At step 532, if there exists multiple definitive matches, then the method 500 takes the No branch from step 532 to step 534 where the one of the plurality of built-in child bots 150(1)-150(n) considers the multiple definitive matches as the child bot level winning intents and sends them to the universal bot 140.

At step 516 of FIG. 5A, if all the definitive or possible matches after normalization of the confidence scores are possible matches, then the method 500 takes the No branch to step 540 of FIG. 5B. At step 540, the one of the plurality of built-in child bots 150(1)-150(n) considers the possible matches with the top X % normalized confidence scores, where X may be configurable by, for example, an administrator or developer of the universal bot 140. At step 542, the one of the plurality of built-in child bots 150(1)-150(n) checks if there exists a unique possible match within the top X % normalized confidence score range. If not, then the method 500 takes the No branch to step 544 and all the possible matches within the top X % normalized confidence score range are considered child bot level winning intents and sent to the universal bot 140. If yes, the method 500 takes the Yes branch to step 546 and the unique possible match within the top X % normalized confidence score range is considered the child bot level winning intent and sent to the universal bot 140.

Figure 6:
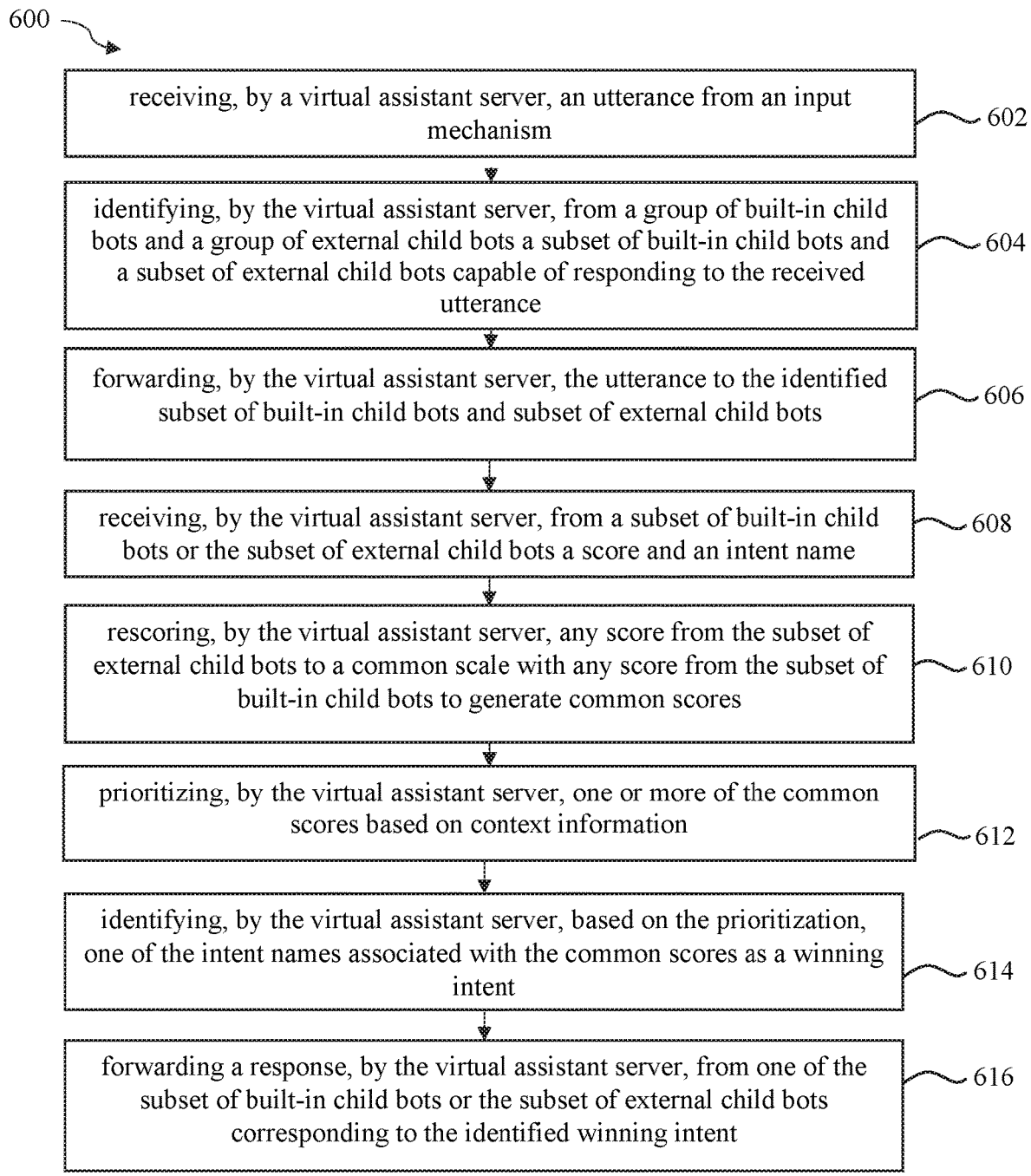
FIG. 6 is a flowchart of another example of a method for receiving the utterance, processing and providing an output with the virtual assistant server shown in FIGS. 1-3.

FIG. 6 is a flowchart of another example of a method of the VA server 130 receiving and processing the utterance and then providing an executable output. In some examples, method 600 may be performed by a system similar or identical to system 100 as illustrated in FIG. 1. In step 602, the VA server 130, receives an utterance from one of the input mechanisms 102-110, although inputs from other types of input mechanisms may be received.

In step 604, the VA server 130 includes information about a group of built-in child bots comprising the plurality of built-in child bots 150(1)-150(n) and a group of built-in child bots comprising the plurality of external child bots 250(1)-250(n) which are linked to the VA server 130. After the VA server 130 receives the utterance, the VA server 130 processes the utterance and identifies scoped child bots which may include, in this example, a subset of the plurality of built-in child bots 150(1)-150(n) or a subset of the plurality of external child bots 250(1)-250(n), capable of responding to the utterance.

In step 606, the VA server 130 forwards the utterance to the scoped child bots which may include the subset of the plurality of built-in child bots 150(1)-150(n) or the subset of the plurality of external child bots 250(1)-250(n). Each of the scoped child bots may process the utterance and one or more of the scoped child bots may forward the intent names, intent match types and confidence scores corresponding to the intents which match the utterance to the VA server 130, if any.

In step 608, the VA server 130 receives the intent names, intent match types and corresponding confidence scores from one or more of the scoped child bots. It may be understood that one or more of the scoped child bots may not identify a matching intent. The scoring method of the plurality of built-in child bots 150(1)-150(n) and the plurality of external child bots 250(1)-250(n) may be different. Each of the plurality of built-in child bots 150(1)-150(n) may follow the same or a different method of scoring. Each of the plurality of external child bots 250(1)-250(n) may follow the same or a different method of scoring. As a result of the different scoring methods of the plurality of external child bots 250(1)-250(n) in comparison with the plurality of built-in child bots 150(1)-150(n), it may be necessary for the VA server 130 to rescore the confidence scores received from the plurality of external child bots 250(1)-250(n) to compare them with the confidence scores received from the plurality of built-in child bots 150(1)-150(n).

In step 610, the VA server 130 rescores any confidence score received from the subset of plurality of external child bots 250(1)-250(n) of the scoped child bots to common scores having a common scale with any confidence score received from the subset of the plurality of built-in child bots 150(1)-150(n) of the scoped child bots, although other techniques for rescoring may be used.

In step 612, the VA server 130 prioritizes one or more of the common scores based on context information. The context information may include information about: the presence of an invocation name in the utterance, eligible child bots, a current child bot, current dialog context and recently used child bots by way of example. The context information may be stored in the memory 204 of the VA server 130. The context information may be updated in the memory 204 of the VA server 130 based on the content of each received utterance. Further, the context information may also be updated based on how the VA server 130 is programmed to manage its memory 204. The prioritization may include adding a bonus score to the common score based on the context information, although other methods of prioritization, such as performing any mathematical operation to the common score, modifying a rank of an intent etc. may be used by way of example. Each common score may be associated with an intent of the scoped child bots.

In step 614, the VA server 130 identifies one of the intents associated with the common scores as a winning intent based on the prioritization, although more than one intent associated with the common scores may be identified as winning intents.

In step 616, the VA server 130 forwards a response from the one of the subset of the plurality of built-in child bots 150(1)-150(n) or the one of the subset of the plurality of external child bots 250(1)-250(n) corresponding to the identified winning intent.

Figure 7:
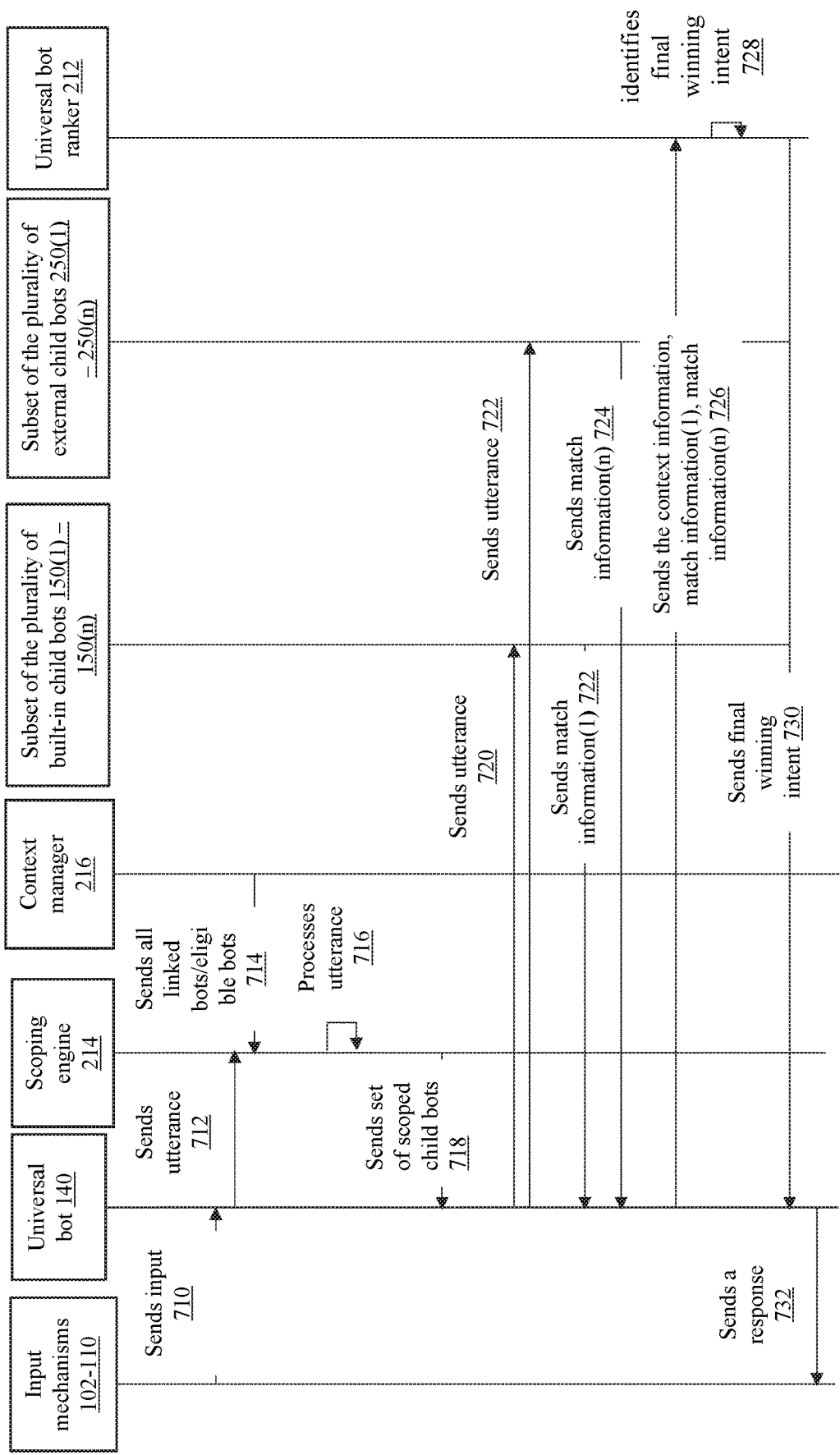
FIG. 7 is a sequence diagram illustrating an example of a method for orchestrating an automated conversation.

FIG. 7 is a sequence diagram illustrating a method for orchestrating an automated conversation according to an example. Step 710 may be performed by the input mechanisms 102-110 comprising one of: the mobile computing device 102, the personal computing device 104, the software program 106, the hardware device 108, or the intelligent device 110 that are illustrated in the example in FIG. 1. Further, the steps 712-732 may be performed by the universal bot 140, the scoping engine 214, the context manager 216, a subset of the plurality of built-in child bots 150(1)-150(n), a subset of the plurality of external child bots 250(1)-250(n), and the universal bot ranker 212 that are illustrated in FIG. 1 and FIG. 2. The configuration of the input mechanisms 102-110 may correspond to the mobile computing device 102, the personal computing device 104, the software program 106, the hardware device 108, or the intelligent device 110 of FIG. 1.

In step 710, the one of the input mechanisms 102-110 may provide an input through channels such as, for example, a web/mobile client, a voice or a telephony application, an email client, a mobile application, a messenger accessible from a social media website etc. The universal bot 140 may be configured to receive the input from the channel. The communication between the universal bot 140 and the one of the input mechanisms 102-110 may be synchronous or asynchronous. The universal bot 140 may receive the input which may include information such as, for example, a universal bot identifier, a user identifier, a channel identifier, location information, utterance. This information in the input is used by the universal bot 140, the plurality of built-in child bots 150(1)-150(n), and/or the plurality of external child bots 250(1)-250(n) to respond to the utterance. The universal bot 140 may detect the language of the utterance and use the detected language to process the utterance.

The universal bot 140 hosted by the VA server 130 may receive the input and extract the utterance from the input. In one example, the utterance may be "Ask HR bot what is my leave balance". Further, the universal bot 140 may use the additional information in the input and the detected language of the utterance to process the utterance.

In step 712, the universal bot 140 may forward the utterance in the input and the detected language to the scoping engine 214 of the universal bot 140. The scoping engine 214, in step 714, may receive information about the plurality of built-in child bots 150(1)-150(n) or the plurality of external child bots 250(1)-250(n) linked to the universal bot 140. In some examples, the context manager 216 may use the user identifier received at step 710 and may identify eligible child bots which may be one or more of the plurality of built-in child bots 150(1)-150(n) or one or more of the plurality of external child bots 250(1)-250(n) accessible by the user.

The scoping engine 214, in step 716, uses the linking information to process the utterance and identify scoped child bots which may include, in this example, a subset of the plurality of child bots 150(1)-150(n) and a subset of the plurality of external child bots 250(1)-250(n) capable of responding to the utterance. To find the scoped child bots, the scoping engine 214, may use the invocation phrases and the training utterances added to the universal bot 140 while linking the plurality of built-in child bots 150(1)-150(n) or the plurality of external child bots 250(1)-250(n) to the universal bot 140. If the scoping engine 214 fails to identify the scoped child bots, fallback ones of the plurality of built-in child bots 150(1)-150(n) or the plurality of external child bots 250(1)-250(n) are used as the scoped child bots.

In step 718, the scoping engine 214 may send information about the scoped child bots to the universal bot 140. In this example, there may be multiple scoped child bots with the invocation phrase "Ask HR bot." The scoping engine 214 may send information such as scoped child bot identifier, scoped match type, matched utterance, unused utterance, and presence of invocation name in the utterance by way of example. The scoped match type may include whether the child bot was matched using the invocation phrase or the training utterances. The matched utterance may be the invocation phrase in utterance when the scoped match type is the invocation phrase. The matched utterance may be the training utterances of the scoped child bots which caused the match. The unused utterance may include the portion of the utterance excluding the invocation phrase. The unused utterance may be sent to the universal bot 140 when the invocation phrase is matched with the utterance. In this example, the unused utterance is "what is my leave balance."

In steps 720 and 722, the scoping engine 214 may send the unused utterance to the scoped child bots including the subset of the plurality of built-in child bots 150(1)-150(n) and the subset of the plurality of external child bots 250(1)-250(n), although the scoping engine 214 may also send the utterance or other types of information to the scoped child bots. The scoping engine 214 may also send a language of the utterance to the scoped child bots. In this example, the scoping engine 214 may send the unused utterance "what is my leave balance" to the scoped child bots. The scoped child bots may in turn forward the unused utterance and the language of the utterance to their corresponding evaluation engines, although the scoped child bots may alternatively forward the utterance to their corresponding evaluation engines. The subset of the plurality of built-in child bots 150(1)-150(n) of the scoped child bots may follow the method 500 illustrated in FIG. 5A and FIG. 5B to evaluate the unused utterance. The subset of the plurality of external child bots 250(1)-250(n) may use proprietary methods developed using, for example, machine learning, neural networks, semantic matching, recent evaluation history to evaluate the unused utterance.

After the evaluation, in step 722, two or more of the scoped child bots may send match information to the universal bot 140. By way of example, one or more of the subset of the plurality of built-in child bots 150(1)-150(n) may send match information(1) to the universal bot 140. Further, in step 724, by way of example, one or more of the subset of the plurality of external child bots 250(1)-250(n) may send match information(n) to the universal bot 140. The match information(1) may include information such as a built-in child bot identifier, a built-in child bot name, response of the built-in child bot for the utterance and child bot level winning intent details, although the match information(1) may include other types of information in other examples. It may be understood that the match information(1) may include responses from one or more of the subset of the plurality of built-in child bots 150(1)-150(n). Further, the match information(n) may include responses from one or more of the subset of the plurality of external child bots 250(1)-250(n).

The child bot level winning intent details may include, by way of example, an intent name, an intent identifier, an intent match type such as definitive or possible match, a name of the engine which output the intent, a confidence score and corresponding scoring phrases. In this example, the matched intent name of one of the subset of the plurality of built-in child bots 150(1)-150(n) may be "Leave balance." The name of the engine which output the intent may be one of the machine learning driven engines 220(1)-220(n). The intent match type may be definitive. The match information(n) may include an external intent name, a confidence score corresponding to the external intent name and a set of training utterances which caused the external intent match, although the match information(n) may include other types of information in other examples. The match information(1) and match information(n) may be sent in, for example, JSON or XML format, by one or more of the subset of the plurality of built-in child bots 150(1)-150(n) and also by one or more of the subset of the plurality of external child bots 250(1)-250(n), although other formats may be used to create and forward the match information(1) and the match information(n). It may be understood that any of the subset of the plurality of built-in child bots 150(1)-150(n) or any of the subset of the plurality of external child bots 250(1)-250(n) may be a second universal bot. As a result, it may be understood that the network 120 may be interconnecting multiple universal bots with each other. One or more of these multiple universal bots may be hosted by the VA server 130 or by external servers. Each of these multiple universal bots may be linked to the universal bot 140. When the match information is received from a built-in or external child bot linked to another universal bot, the match information may also include a universal bot identifier.

Rescoring

The plurality of built-in child bots 150(1)-150(n) may output the confidence scores in a common scale, although one or more may output in a different scale requiring normalization. In this example, the confidence scores output by the plurality of built-in child bots 150(1)-150(n) may be considered as common scores without any rescoring. However, the plurality of external child bots 250(1)-250(n) may output the confidence scores in a different scale from the scale used by the plurality of built-in child bots 150(1)-150(n). Hence, any confidence score received from one or more of the subset of the plurality of external child bots 250(1)-250(n) as part of the match information(n) may be rescored by the universal bot 140 into a common score having a common scale used by the plurality of built-in child bots 150(1)-150(n). The rescoring is performed by using the training utterances of the plurality of external child bots 250(1)-250(n) which caused the external intent match, although other types of information or metadata may be used for the rescoring. In one example, all the training utterances of the plurality of external child bots 250(1)-250(n) may be added to the universal bot 140 during the linking process. The universal bot 140 may receive intent names from one or more of the subset of plurality of external child bots 250(1)-250(n). Subsequently, the universal bot 140 may compare, by way of example using natural language processing techniques, the utterance with the training utterances of the one or more of the of the subset of plurality of external child bots 250(1)-250(n) which sent the intent names. Based on this comparison, the universal bot 140 identifies the closest training utterances which may have caused the match of the utterance with the intents of one or more of the of the subset of plurality of external child bots 250(1)-250(n). The closest training utterances may be compared, by way of example using natural language processing techniques, with the utterance to arrive at the common scores in the common scale, although other methods may be used to arrive at the common scores. The comparison may be, for example, a semantic comparison, a word match, although other types of comparison may be used. The common scores may be sent to the universal bot ranker 212 as part of the match information(n).

The universal bot 140 may, in this example, receive match information(1) and match information(n) from two or more of the scoped child bots. The universal bot 140 may also receive context information from the context manager 216 which may include information about: presence of an invocation name in the utterance, eligible child bots, a current child bot, current dialog context and recently used child bots.

The universal bot 140, in step 726, may send the match information(1), match information(n) and the context information to the universal bot ranker 212. The universal bot ranker 212 may also receive the context information from the context manager 216. The universal bot ranker 212 uses this information, in step 728, to identify the final winning intent. The universal bot ranker 212 may use the context information to prioritize one or more of the subset of the built-in child bots 150(1)-150(n) and/or one or more of the subset of the external child bots 250(1)-250(n). The prioritization may be done by adding a bonus score to one or more of the common scores. In this example, the two or more of the scoped child bots which sent the match information(1), match information(n) to the universal bot 140 may comprise a first scoped child bot and a second scoped child bot. By way of example the first scoped child bot may be recently used. The first scoped child bot may as part of match information(1), by way of example, output an intent: "leave balance" as a definitive match with a first common score of 0.8 and the second scoped child bot may as part of match information(n), by way of example, output an intent: "general leave information" as a definitive match with a second common score of 0.85. The prioritization may include adding a bonus score to the common score of the intent.

The universal bot ranker 212 may receive multiple definitive matches as part of the match information(1) or match information(n). When only one definitive match is received as part of the match information(1) and the match information(n), the definitive match is identified as the final winning intent. When only one child bot sends, for example match information(1), to the universal bot 140 and the match information(1) includes multiple definitive matches, all the multiple definitive matches are identified as final winning intents. When multiple definitive matches are received as part of the match information(1) or the match information(n) from multiple child bots, the universal bot ranker 212 may follow a prioritization method to identify the final winning intent. When only one possible match is received and no definitive matches are received as part of the match information(1) and the match information(n), the possible match may be identified as the final winning intent. When multiple possible matches are received and no definitive matches are received as part of the match information(1) or the match information(n) from multiple child bots, the universal bot ranker 212 may follow the prioritization method to identify the final winning intent.

The prioritization method may include three steps:
(a) matching the utterance with the invocation names of the first scoped child bot and the second scoped child bot which sent the match information(1) and match information(n). If there is a match of the utterance with the invocation name of the first scoped child bot or the second scoped child bot, then the corresponding first scoped child bot or the second scoped child bot may be prioritized.
(b) checking for the presence of a currently used child bot among the first scoped child bot and the second scoped child bot which sent the match information(1) and match information(n). If present, the currently used child bot may be prioritized. The currently used child bot may include the child bot in conversation with one of the input mechanisms 102-110.
(c) prioritizing by addition of a bonus score to the first common score of the first scoped child bot or the second common score of the second scoped child bot which sent the match information(1) and match information(n) based on recently used child bot information in the context information. The addition of the bonus score may also be based on other metadata in the context information.

The steps may be executed in the order (a), (b), (c) in this example, although other orders and/or steps may be used in other examples. The multiple definitive matches or the multiple possible matches may be prioritized using these three steps. If at any step, only one definitive match or one possible match remains, the prioritization method may not proceed to execute the other steps. In this example, as multiple child bots responded with definitive matches, the universal bot ranker 212 initiates the prioritization method. In step(a), as the utterance may matches the invocation name of both the first scoped child bot and the second scoped child bot, only one definitive match does not remain. Hence, the prioritization method may proceed to step(b). In step(b), both the first scoped child bot and the second scoped child bot may not be the current child bot in conversation with one of the input mechanisms 102-110. As a result, the prioritization method may proceed to step(c). The first scoped child bot may be a recently used child bot. In step(c) based on the recently used child bot information in the context information, a bonus score of 0.1 may be added to the first common score of the intent: "leave balance" making its confidence score 0.9. In this example, after the addition of the bonus score to the first common score, the first common score is greater than the second common score. Hence, the intent: "leave balance" corresponding to the first scoped child bot is identified, in this example, as a final winning intent. It may be understood that the universal bot ranker 212 may use only step (a), (b) or (c) or a combination of them for prioritization.

In step 730, the universal bot ranker 212 may send the final winning intent to the universal bot 140. The universal bot 140 may forward the response from one of the subset of the plurality of built-in child bots 150(1)-150(n) or one of the subset of plurality of external child bots 250(1)-250(n) corresponding to the identified final winning intent. In this example, the universal bot 140 may fetch the response from the first scoped child bot for the utterance and forward it to one of the input mechanisms 102-110 from which the utterance was received. Alternatively, the universal bot 140 may already have the response of the first scoped child bot as part of the match information(1) and may forward it to one of the input mechanisms 102-110 from which the utterance was received.

A follow up intent "apply for a leave" of the final winning intent "leave balance" may be configured in the universal bot 140 hosted in the VA server 130 or added during runtime by the VA server 130. After executing the final winning intent, the VA server 130 may execute the follow up intent. The VA server 130 may for example look up the memory 204 for the existence of the follow up intent after the executing the final winning intent, although the follow up intent may be obtained or otherwise determined in other manners based on the final winning intent. As the follow up intent "apply for a leave" exists in the memory 204 of the VA server 130, the VA server 130 may execute the follow up intent "apply for a leave."

Figure 8:
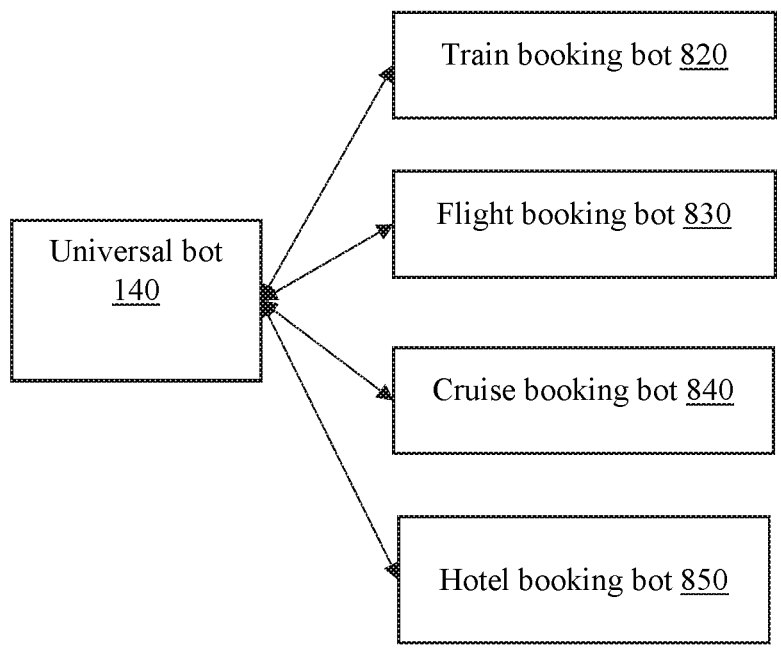
FIG. 8 is a block diagram of an example of a travel use case with a universal bot linked with multiple child bots configured to orchestrate an automated conversation.

FIG. 8 is an example of use case involving travel processed by the universal bot 140 linked with multiple child bots. In this example, the universal bot 140 may be linked to a train booking bot 820, a flight booking bot 830, a cruise booking bot 840 and a hotel booking bot 850, although other child bots having different functionalities may be linked to the universal bot 140. The train booking bot 820 and the flight booking bot 830 may be two of the plurality of built-in child bots 150(1)-150(n) whereas the cruise booking bot 840 and the hotel booking bot 850 may be two of the plurality of external child bots 250(1)-250(n). Each of these child bots may be developed by a different department of an enterprise and having them linked to the universal bot 140 reduces the time required for an end user to obtain necessary information. Further, the linking improves the standardization of responses, reduces the time to market and the costs of deployment. Linking the child bots to the universal bot 140 also improves the relevancy, accuracy of the results and reduce the utilization of processor cycles, memory, power and network bandwidth necessary to retrieve the results. The train booking bot 820 may be configured with an invocation name "trainbot" and invocation phrases: "ask trainbot to", "hey trainbot." The flight booking bot 830 may be configured with an invocation name "flyme" and invocation phrases: "ask flyme to", "hey flyme." The cruise booking bot 840 may be configured with an invocation name "cruiseon" and invocation phrases: "ask cruiseon to", "hey cruiseon." The hotel booking bot 850 may be configured with an invocation name "stayin" and invocation phrases: "ask stayin to", "hey stayin." The linking of the child bots to the universal bot 140 may be done using other invocation names, phrases or training utterances.

Figure 9A:
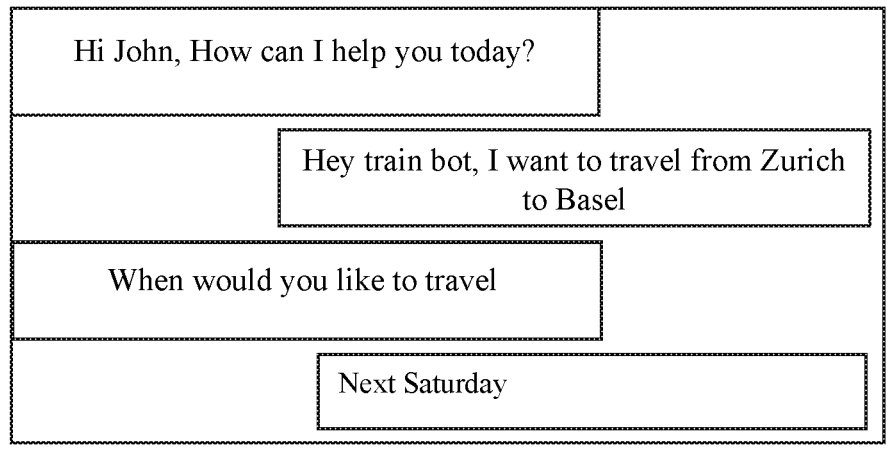
FIGS. 9A-9C are wireframes of an example of illustrating an interaction of an input mechanism with the universal bot illustrated in FIG. 8.
Figure 9B:
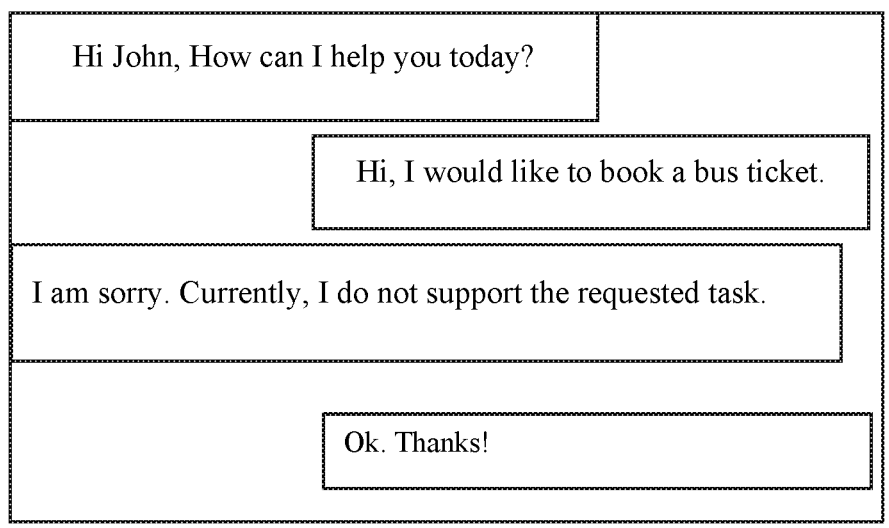
Figure 9C:
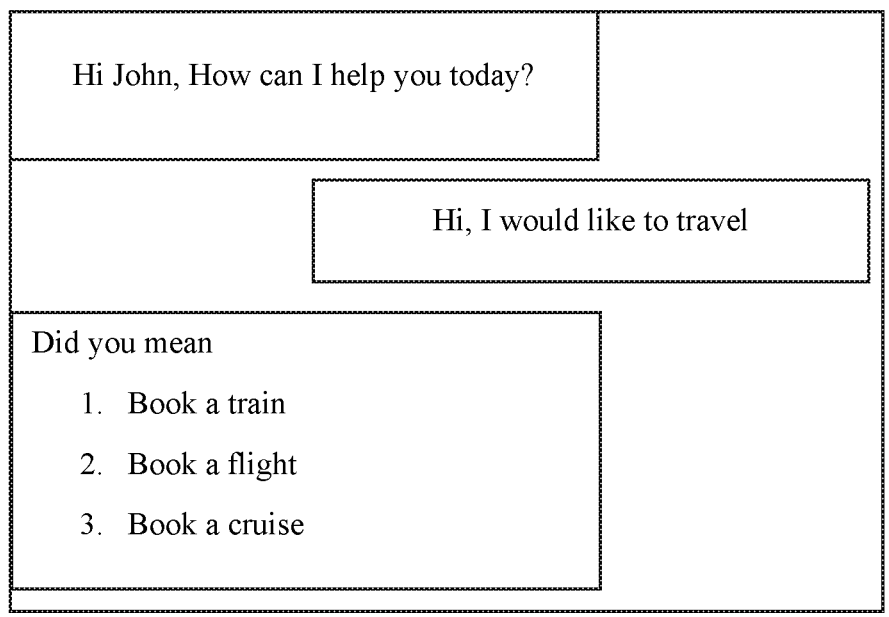

FIGS. 9A, 9B and 9C are wireframes of examples of interactions of one or more of the input mechanisms 102-110 with the universal bot 140 illustrated in FIG. 8. As illustrated in FIG. 9A, one of the input mechanisms 102-110 as illustrated in FIG. 1 may interact with the VA server 130.

The universal bot 140 receives the utterance "Hey trainbot, I want to travel from Zurich to Basel". The universal bot 140 checks for the invocation phrases of the train booking bot 820, the flight booking bot 830, the cruise booking bot 840 and the hotel booking bot 850 in the utterance. As the utterance matches the invocation phrase of the train booking bot 820, the universal bot 140 scopes it and forwards the unused utterance: "I want to travel from Zurich to Basel," to the train booking bot 820. The train booking bot 820 evaluates the unused utterance finds an intent name: "book a train ticket" which matches the unused utterance and may send a confidence score, a response: ""When would you like to travel", an intent match type: "definitive match" to the universal bot 140. As the universal bot 140 receives only one intent which is a definitive match, the universal bot 140 identifies "book a train ticket" as the final winning intent and the response from the train booking bot 820 may be forwarded to the input mechanism. Alternatively, the universal bot 140 may only receive the intent name, the intent match type and the confidence score from the train booking bot 820. Upon determining that the final winning intent is "book a train ticket", the universal bot 140 may execute the dialog corresponding to the intent "book a train ticket" and forward the response to one of the input mechanisms 102-110 from which the utterance was received.

As illustrated in FIG. 9B, one of the input mechanisms 102-110 as illustrated in FIG. 1 may interact with the VA server 130. The universal bot 140 receives the utterance "Hi, I would like to book a bus ticket." The universal bot 140 compares the utterance with the invocation phrases of the train booking bot 820, the flight booking bot 830, the cruise booking bot 840 and the hotel booking bot 850 and does not find a match. As the comparison of the utterance with the invocation phrases does not result in a match, the universal bot 140 may compare the utterance with training utterances of the train booking bot 820, the flight booking bot 830, the cruise booking bot 840 and the hotel booking bot 850 added during the linking. Further, if the comparison of the utterance with the training utterances also do not result in a match, the universal bot 140 may send the utterance to fallback ones of train booking bot 820, the flight booking bot 830, the cruise booking bot 840 or the hotel booking bot 850 for evaluation. The utterance may not find a match comparing the utterance with training utterances of the train booking bot 820, the flight booking bot 830, the cruise booking bot 840 and the hotel booking bot 850. The utterance also may not receive a response from the fallback ones of the train booking bot 820, the flight booking bot 830, the cruise booking bot 840 or the hotel booking bot 850 after evaluation. As the utterance may not be relevant to the train booking bot 820, the flight booking bot 830, the cruise booking bot 840 and the hotel booking bot 850 illustrated in FIG. 8, the universal bot 140 may send a response, by way of example, "I am sorry. Currently, I do not support the requested task."

As illustrated in FIG. 9C, one of the input mechanisms 102-110 as illustrated in FIG. 1 may interact with the VA server 130. The universal bot 140 receives the utterance "Hi, I would like to travel" from one of the input mechanisms 102-110. The universal bot 140 checks the invocation phrases of the train booking bot 820, the flight booking bot 830, the cruise booking bot 840 and the hotel booking bot 850 for a match. As the utterance does not match with the invocation phrases of any of them, the universal bot 140 compares the utterance with training utterances of the train booking bot 820, the flight booking bot 830, the cruise booking bot 840 and the hotel booking bot 850 added during the linking. The utterance may match the training utterances of the train booking bot 820, the flight booking bot 830 and the cruise booking bot 840. The train booking bot 820, the flight booking bot 830 and the cruise booking bot 840 are considered scoped child bots. The universal bot 140 forwards the utterance to the scoped child bots. Subsequently, the scoped child bots process the utterance and all of them may send intent match types as definitive matches for their intents: "book a train," "book a flight" and "book a cruise" correspondingly. As the scoped child bots respond with non-unique definitive matches, the universal bot 140 may forward all the three intents to one of the input mechanisms 102-110 from which the utterance was received.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for orchestrating an automated conversation, the method comprising:

receiving, by a virtual assistant server, an utterance from an input mechanism;

evaluating, by the virtual assistant server, the utterance to identify a plurality of intents corresponding to the utterance and calculate common scores using natural language processing techniques for each of the plurality of intents, wherein the identification of the plurality of intents in the evaluating the utterance are performed by a semantic rules driven engine and at least one of a machine learning driven engine, a component relationship driven engine, or a business rules driven engine of the virtual assistant server to drive intent recognition, and wherein the semantic rules driven engine performs intent recognition by comparing the utterance with one or more pre-defined patterns;

ranking, by the virtual assistant server, the identified plurality of intents based on the calculated common scores;

identifying, by the virtual assistant server, based on the ranking, a first winning intent and a second winning intent from the identified plurality of intents;

prioritizing, by the virtual assistant server, one of the first winning intent or the second winning intent to identify a final winning intent based on context information; and executing, by the virtual assistant server, the final winning intent and then, after the execution of the final winning intent, executing a follow up intent that is determined based on the final winning intent.

2. The method of claim 1, wherein the context information comprises data about: presence of an invocation name in the utterance, a set of eligible bots, a current child bot, current dialog context and recently used bots.

3. The method of claim 1, wherein the ranking the identified plurality of intents is further based on corresponding scoring phrases which caused the identification for each of the plurality of intents, wherein the corresponding phrases comprise one or more of: a training utterance which caused the identification of one of the plurality of intents, a question which caused the identification of one of the plurality of intents, or a name of one of the plurality of intents which caused the identification of one of the plurality of intents.

4. The method of claim 1, wherein the at least one of the machine learning driven engine, the component relationship driven engine, or the business rules driven engine comprises the component relationship driven engine;
wherein the component relationship driven engine comprises a knowledge graph and performs intent recognition by comparing a vector created for the utterance with one or more vectors created for one or more questions of one or more shortlisted paths of the knowledge graph, and wherein the shortlisted paths are determined by mapping one or more terms in the utterance to one or more node names of the knowledge graph further comprising evaluating relationships between components in the utterance to identify the plurality of intents.

5. A device that orchestrates an automated conversation, the device comprising:
a processor;
a memory coupled to the processor which is configured to be capable of executing programmed instructions stored in the memory to:
receive an utterance from an input mechanism;
evaluate the utterance to identify a plurality of intents corresponding to the utterance and calculate common scores using natural language processing techniques for each of the plurality of intents, wherein the identification of the plurality of intents in the evaluating the utterance are performed by a semantic rules driven engine and at least one of a machine learning driven engine, a component relationship driven engine, or a business rules driven engine of the virtual assistant server to drive intent recognition, and wherein the semantic rules driven engine performs intent recognition by comparing the utterance with one or more pre-defined patterns;
rank the identified plurality of intents based on the calculated common scores;
identify based on the ranking, a first winning intent and a second winning intent from the identified plurality of intents;
prioritize one of the first winning intent or the second winning intent to identify a final winning intent based on context information; and
execute the final winning intent and then, after the execution of the final winning intent, execute a follow up intent that is determined based on the final winning intent.

6. The device of claim 5, wherein the context information comprises data about: presence of an invocation name in the utterance, a set of eligible bots, a current child bot, current dialog context and recently used bots.

7. The device of claim 5, wherein the ranking the identified plurality of intents is further based on corresponding phrases which caused the identification for each of the plurality of intents, wherein the corresponding phrases comprise one or more of: a training utterance which caused the identification of one of the plurality of intents, a question which caused the identification of one of the plurality of intents, or a name of one of the plurality of intents which caused the identification of one of the plurality of intents instructions are further configured to rank the identified plurality of intents based on corresponding scoring phrases for each of the plurality of intents.

8. The device of claim 5, wherein the at least one of the machine learning driven engine, the component relationship driven engine, or the business rules driven engine comprises the component relationship driven engine;
wherein the component relationship driven engine comprises a knowledge graph and performs intent recognition by comparing a vector created for the utterance with one or more vectors created for one or more questions of one or more shortlisted paths of the knowledge graph, and wherein the shortlisted paths are determined by mapping one or more terms in the utterance to one or more node names of the knowledge graph is further configured to evaluate relationships between components in the utterance to drive intent recognition.

9. A non-transitory computer-readable medium having stored thereon instructions for orchestrating an automated conversation which when executed by a processor, causes the processor to perform steps comprising:
receiving receive an utterance from an input mechanism;
evaluating evaluate the utterance to identify a plurality of intents corresponding to the utterance and calculate common scores using natural language processing techniques for each of the plurality of intents, wherein the identification of the plurality of intents in the evaluating the utterance are performed by a semantic rules driven engine and at least one of a machine learning driven engine, a component relationship driven engine, or a business rules driven engine of the virtual assistant server to drive intent recognition, and wherein the semantic rules driven engine performs intent recognition by comparing the utterance with one or more pre-defined patterns;
ranking rank the identified plurality of intents based on the calculated common scores;
identifying identify based on the ranking, a first winning intent and a second winning intent from the identified plurality of intents;
prioritizing prioritize one of the first winning intent or the second winning intent to identify a final winning intent based on context information; and
executing execute the final winning intent and then, after the execution of the final winning intent, executing a follow up intent that is determined based on the final winning intent.

10. The non-transitory computer-readable medium of claim 9, wherein the context information comprises data about: presence of an invocation name in the utterance, a set of eligible bots, a current child bot, current dialog context and recently used bots.

11. The non-transitory computer-readable medium of claim 9, wherein the rank the identified plurality of intents is further based on corresponding phrases which caused the identification for each of the plurality of intents, wherein the corresponding phrases comprise one or more of: a training utterance which caused the identification of one of the plurality of intents, a question which caused the identification of one of the plurality of intents, or a name of one of the plurality of intents which caused the identification of one of the plurality of intents instructions are further configured to rank the identified plurality of intents based on corresponding scoring phrases for each of the plurality of intents.

12. The non-transitory computer-readable medium of claim 9, wherein the at least one of the machine learning driven engine, the component relationship driven engine, or the business rules driven engine comprises the component relationship driven engine;

wherein the component relationship driven engine comprises a knowledge graph and performs intent recognition by comparing a vector created for the utterance with one or more vectors created for one or more questions of one or more shortlisted paths of the knowledge graph, and wherein the shortlisted paths are determined by mapping one or more terms in the utterance to one or more node names of the knowledge graph is further configured to evaluate relationships between components in the utterance to drive intent recognition.

\* \* \* \* \*